United States Patent
Campos et al.

(10) Patent No.: US 11,688,183 B2
(45) Date of Patent: *Jun. 27, 2023

(54) SYSTEM AND METHOD OF DETERMINING A CURVE

(71) Applicant: NETRADYNE, INC., San Diego, CA (US)

(72) Inventors: Michael Campos, La Jolla, CA (US); Venkata Sreekanta Reddy Annapureddy, San Diego, CA (US); David Jonathan Julian, San Diego, CA (US); Veeresh Taranalli, San Diego, CA (US); Jonathan Albert Cox, Imperial Beach, CA (US); Arvind Yedla, La Jolla, CA (US)

(73) Assignee: NETRADYNE, INC., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/592,264

(22) Filed: Feb. 3, 2022

(65) Prior Publication Data
US 2022/0157068 A1      May 19, 2022

Related U.S. Application Data

(63) Continuation of application No. 16/753,606, filed as application No. PCT/US2018/054732 on Oct. 5, 2018, now Pat. No. 11,244,174.

(Continued)

(51) Int. Cl.
*G06V 20/56*      (2022.01)
*G06N 3/04*      (2023.01)
(Continued)

(52) U.S. Cl.
CPC .......... *G06V 20/588* (2022.01); *G06F 18/214* (2023.01); *G06F 18/217* (2023.01);
(Continued)

(58) Field of Classification Search
None
See application file for complete search history.

(56) References Cited

U.S. PATENT DOCUMENTS 11,244,174 B2 *   2/2022   Campos ................. G06V 10/82
2010/0329513 A1   12/2010   Klefenz
(Continued)

OTHER PUBLICATIONS

International Search Report and Written Opinion in International Patent Application No. PCT/US2018/054732 dated Feb. 8, 2019 (6 pages).

*Primary Examiner* — Leon Flores
(74) *Attorney, Agent, or Firm* — Michael Campos

(57) ABSTRACT

A neural network is configured to process image data captured by a vehicle-mounted camera. The neural network includes common processing layers (a trunk) and separate, parallelizable processing layers (branches). An object detection branch of the neural network is trained to detect objects that may be visible from the vehicle-mounted camera, such as cars, trucks, and traffic signs. A curve determination branch is trained to detect and parameterize salient curves, such as lane boundaries and road boundaries. The curve determination branch itself is configured with a trunk and branch architecture, having both common and separate processing layers. A first branch computes a likelihood that a curve is present in a given location of the image data and a second branch further localizes the curve within the given location if such a curve is present. Training of the different branches of the neural network may be decoupled.

20 Claims, 26 Drawing Sheets

Related U.S. Application Data

(60) Provisional application No. 62/569,480, filed on Oct. 6, 2017.

(51) Int. Cl.
*G06N 3/08* (2023.01)
*G06F 18/214* (2023.01)
*G06F 18/21* (2023.01)
*H04N 23/54* (2023.01)
*G06V 10/75* (2022.01)
*G06V 10/82* (2022.01)

(52) U.S. Cl.
CPC .................. *G06N 3/04* (2013.01); *G06N 3/08* (2013.01); *G06V 10/752* (2022.01); *G06V 10/82* (2022.01); *H04N 23/54* (2023.01)

(56) References Cited

U.S. PATENT DOCUMENTS

2015/0204687 A1    7/2015   Yoon et al.
2018/0285659 A1   10/2018   Kwant et al.

\* cited by examiner

SYSTEM AND METHOD OF DETERMINING A CURVE

CROSS-REFERENCE TO RELATED APPLICATION

The present application is a continuation of U.S. patent application Ser. No. 16/753,606 filed on $3^{rd}$ of Apr. 2020, which is a U.S. National Stage Application of International Application No. PCT/US2018/054732 filed on 5th of Oct. 2018, which designates the United States, and which claims the benefit of U.S. Provisional Patent Application No. 62/569,480 filed on 6th of Oct. 2017, and titled, "SYSTEM AND METHOD OF DETERMINING A CURVE", the disclosure of which is each expressly incorporated by reference in its entirety.

BACKGROUND

Field

Certain aspects of the present disclosure generally relate to visual perceptual systems, intelligent driving monitoring systems (IDMS), advanced driver assistance systems (ADAS), autonomous driving systems, and more particularly to systems and methods for determining a curve, which may include detecting the presence of a curve in visual data and determining a parameterization of the curve.

BACKGROUND

In many driving situations, successful driving may depend on detecting the presence of curves, such as lane and road boundaries. For example, if a driver notices a slow-moving car, he may respond differently depending on whether the slow-moving car is currently in the driver's lane. If so, he may need to slow down or change to another lane, if one is available.

Reliable lane determination may benefit a number of driving related systems and devices, including IDMS, ADAS, and autonomous systems devices. For example, a curve determination system may be used to determine if a driver is tailgating a detected car in his or her lane. As lane detection systems and methods become more accurate and reliable, IDMS, ADAS, autonomous driving systems, and the like, will also become more accurate and reliable.

Current methods of lane detection may perform well in some driving scenarios, but poorly in others. For example, current lane detection systems and methods may exhibit acceptable performance on uncrowded highways in daylight hours. Unfortunately, current methods of lane detection often perform inaccurately and unreliably in several commonly encountered real-world driving situations. While much effort has been expended in curve fitting systems and methods, the complexity and variability of real-world driving situations continue to make curve determination challenging in the context of many driving situations. For example, in many real-world driving scenarios, lane boundaries may be poorly marked, missing, or invalid. In these situations, current lane detection systems and methods may fail to detect lanes or may provide false and/or misleading lane detections. Unreliable and/or inaccurate detections from current lane detection systems and methods may contribute to an overall unsatisfactory performance of these same systems. Due to poor reliability in some situations, these systems may be constrained so that they only function in a limited number of contexts, such as on highways, in which lane detection may be reliable.

Accordingly, aspects of the present disclosure are directed to improved systems and methods for curve determination, which may include systems and methods for lane detection, parameterization of detected lanes, road boundary detection, and the like. In turn, aspects of the present disclosure may improve many driving related applications such as IDMS, driver monitoring, ADAS, autonomous driving systems, high-definition mapping, among others.

SUMMARY OF THE INVENTION

The present disclosure provides systems and methods for determining a curve. Certain curve determination systems and methods improve upon the prior art by performing curve detection and curve parameterization steps at substantially the same time.

Certain aspects of the present disclosure provide a method. The method generally includes receiving an image from a camera coupled to a vehicle; processing the image with a trained machine learning model to produce a curve detection data and a first regression point data; and determining a curve based at least in part on the curve detection data, and the first regression point data.

Certain aspects of the present disclosure provide an apparatus. The apparatus generally includes a memory unit; and at least one processor coupled to the memory unit, in which the at least one processor is configured to receive an image from a camera coupled to a vehicle; process the image with a trained machine learning model to produce: a curve detection data and a first regression point data. The at least one processor is further configured to determine a curve based at least in part on the curve detection data and the first regression point data.

Certain aspects of the present disclosure provide an apparatus. The apparatus generally includes means for receiving an image from a camera coupled to a vehicle; means for processing the image with a trained machine learning model to produce a curve detection data; a first regression point data; and a second regression point data; and means for determining a curve based at least in part on the curve detection data, the first regression point data and the second regression point data.

Certain aspects of the present disclose provide a computer program product. The computer program product generally includes a non-transitory computer-readable medium having program code recorded thereon, the program code comprising program code to: receive an image from a camera coupled to a vehicle; process the image with a trained machine learning model to produce: a curve detection data and a first regression point data; and determine a curve based at least in part on the curve detection data, the first regression point data and the second regression point data.

DETAILED DESCRIPTION

Figure 1B:
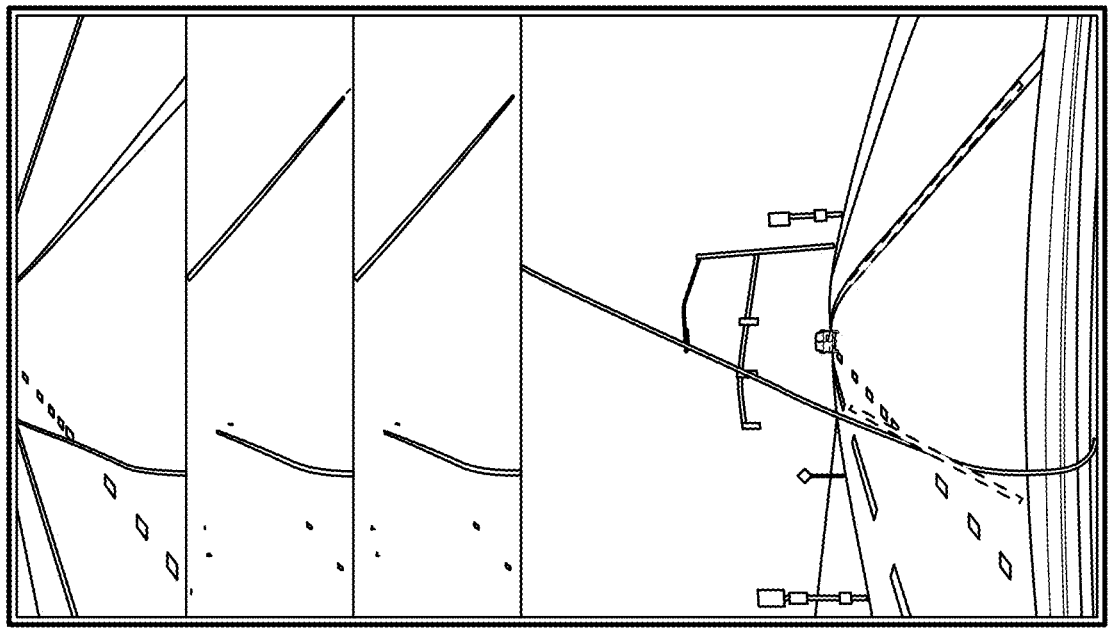
FIG. 1B illustrates an example of a device configured to determine a curve in accordance with certain aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

It must be noted that as used herein and in the appended claims, the singular forms "a", "an", and "the" include plural referents unless the context clearly dictates otherwise. Thus, for example, reference to "an object" includes a plurality of objects.

Systems and Methods of Curve Detection and Curve Fitting

Lane detection systems and methods may serve a variety of uses. In an ADAS, for example, lane determination may be used to determine if a driver is drifting out of his lane, at which point the ADAS may issue an alert signal. In an autonomous driving system lane detection may be used in path planning. For example, upon detecting that a car ahead is attempting to merge into the driver's lane, a control system may execute a lane change, which may include determining when the driver has completed a lane change maneuver.

Lane determination may be accomplished with a number of different sensors, including LIDAR, camera, and special-purpose light reflectivity sensors that may be pointed directly at the ground on the sides of a vehicle, as well as with a combination of multiple sensors. Most, if not all, existing lane detection systems and methods involve substantially sequential processing steps. In general, candidate lane segments are identified first, and then second, a subset of the candidate segments may be joined together to determine whether some subset of the candidate segments constitute a lane boundary. As described below, this general approach encounters numerous real-world challenges.

In contrast, certain aspects of the present disclosure involve (a) determining whether a lane boundary is present in a particular location and (b) identifying candidate lane segments, where these two processing steps are performed substantially in parallel. Furthermore, as illustrated below, determining whether a lane is present may be performed even if there are no characteristic local features of candidate lane segments (such as high contrast light-dark transitions) present in the visual data.

Existing systems and methods for curve determination may rely on sequential steps of curve detection followed by curve fitting. In one example, a system may employ computer vision techniques for detecting candidate lane segments, for example, by detecting high-contrast light-dark transitions in the image. Such as system may then use outlier removal techniques to identify a subset of high contrast locations that are collinear, and finally, data regression techniques to parameterize a curve through the identified subset.

Alternatively, or in addition, machine learning techniques may be employed to augment one or more steps of a lane determination pipeline. In one example, a machine learning model may be used to identify candidate high-contrast regions of an image that might belong to a lane boundary. This processing step may then be filed by outlier removal and regression techniques just described.

An example of a computer vision-based system for lane detection may include the following steps. First, an image may be captured at a camera that is mounted in a vehicle windshield facing forward. The image may then be blurred, for example, with a Gaussian filter to smooth out spatially high-frequency irregularities. Next, an edge detector, such as a canny edge detector, may be applied to the filtered image to identify regions having sharp contrasts that survive the image smoothing step, and that may therefore correspond to an edge of interest. As lane markings tend to have distinct edges, the output of the edge detector may include an indication of the lane markings, although it may also include other distinct edges in the scene. A region-of-interest mask may then be applied to the output of the edge detector. Since lane markings are on a road, a region-of-interest mask may, for example, filter out any outputs of the edge detector corresponding to the top half of the image. A Hough transform may then be applied to identify straight lines that might connect the remaining detected edges. The outputs of the Hough transform may then be reduced to a pair of lane boundaries corresponding to the left and right lane boundaries of the driver's lane.

A lane determination method or system may apply additional processing steps to improve various aspects of a general computer-vision pipeline, such as the pipeline just described. Some examples may utilize domain-specific information to improve the reliability of the lane detection. For example, in the United States lane markings are typically yellow or white. Based on this domain-specific information, a lane detection system that is intended to operate in the United States may calculate a yellow channel mask and a white channel mask. These masks may facilitate the lane detection by identifying pixels having a color within a range of a specified yellow or white color corresponding to typical lane markings. These masks may be applied to the image prior to a Gaussian smoothing step, for example. This technique may have the effect of boosting yellow and white pixels so that they are more likely to be detected as lanes.

Curve Determination Challenges

While lane determination methods may operate satisfactorily on un-crowded highways where lane markings are clear and present, they may fail to operate satisfactorily in other situations. Lane detection situations that remain challenging for today's systems and methods of lane determination may include: roads that are curved, roads that do not have clear lane markings, dense traffic scenarios in which lane markings may be occluded by other cars, and the like. Such situations may be encountered on side streets, parking lots, freshly paved roads, and roads covered in snow or rain. Additionally, even when lane markings are clearly present, the detection of markings may be difficult or confusing. Examples include intersections and turn bays, places where old markings partially or fully remain, or in heavy traffic where other cars may occlude the lane markings.

For some applications, particularly driving applications such as IDMS, ADAS, autonomous driving systems, and HD mapping, a user may desire reliable performance over a large and diverse geographical region. Further, it may be desired that such systems are robust to extreme weather conditions, lighting conditions, and the like. The current limitations of lane detection systems, therefore, remain a source of frustration for the development of safer and more reliable driving systems.

In particular, systems and methods of curve determination that rely on sequential steps of feature detection and curve fitting may be prone to a variety of challenges. With a sequential processing technique, errors may corrupt one or more steps in a lane determination pipeline. Errors may be introduced, for example, at a processing step that detects points on a putative lane boundary curve, at a step that combines a number of points into a detected lane boundary, at other steps in the processing sequence, or at more than one step.

Figure 1A:
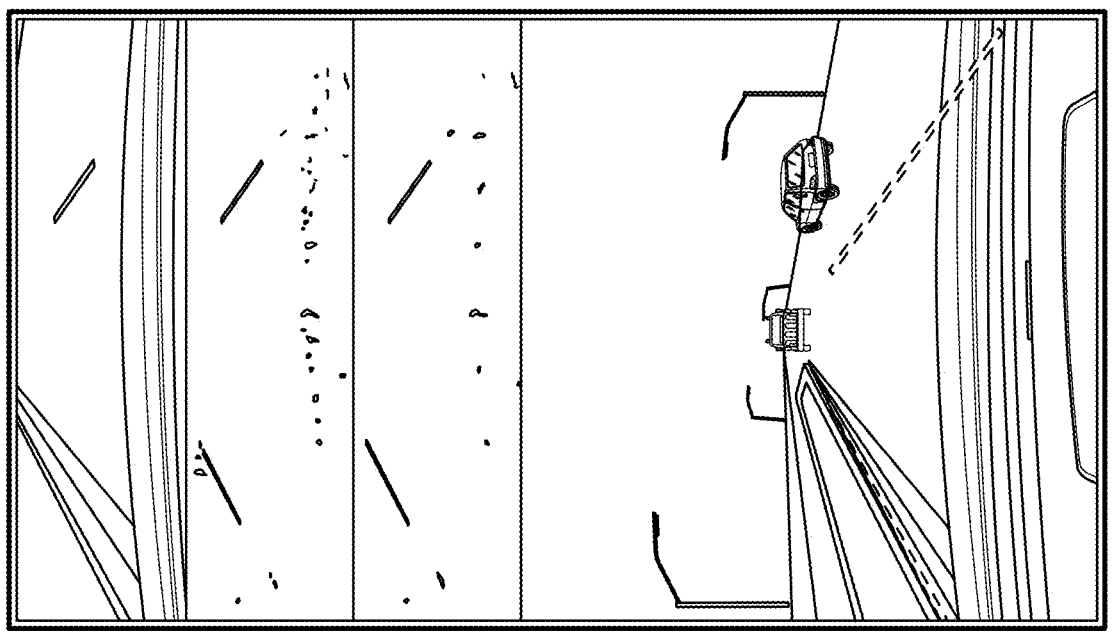
FIG. 1A illustrates an example of a device configured to determine a curve in accordance with certain aspects of the present disclosure.

FIG. 1A and FIG. 1B illustrate two examples in which a lane determination error is introduced at a point/edge detection step. In FIG. 1A, the top of the curb is the highest contrast edge on the left side of the image. In FIG. 1B, light that is reflected from a crack in the windshield provides a set of points that confuse the system such that they output of the system indicates that a line along the curve of the windshield crack is a lane boundary.

Figure 2B:
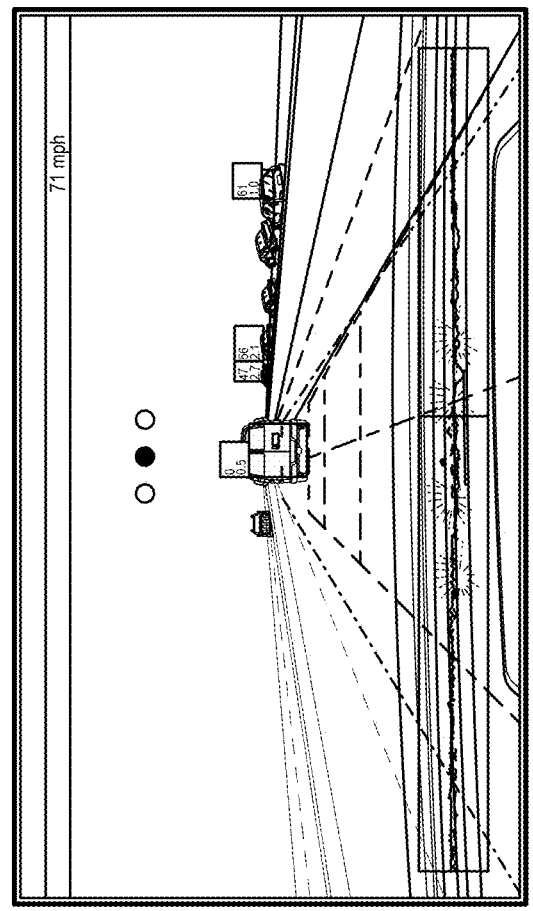
FIG. 2B illustrates an example of a method for determining a curve in accordance with certain aspects of the present disclosure.
Figure 2A:
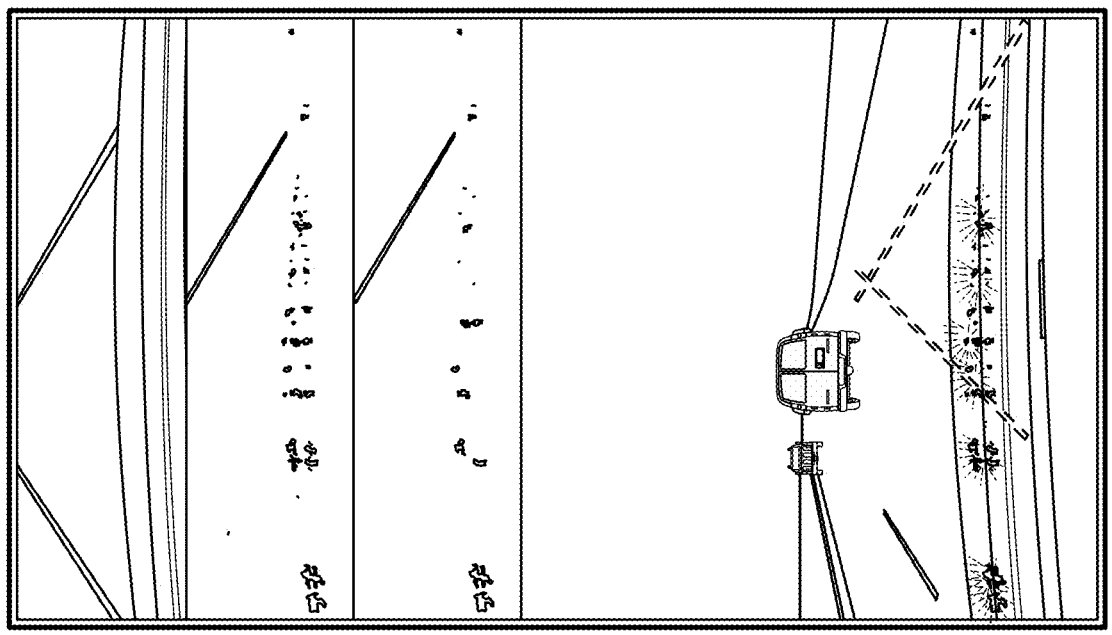
FIG. 2A illustrates an example of a device configured to determine a curve in accordance with certain aspects of the present disclosure.

For FIG. 1A, FIG. 1B, and FIG. 2A, there are 4 panels within each figure. The bottom panel is an image taken from vehicle-mounted camera. The top three panels are each about one-quarter of the height of the bottom panel and they each correspond to about a horizontal stripe from about one-quarter of the way from the bottom of the image to about one-half of the way from the bottom of the image. The top panel is a black and white representation of this horizontal strip. The second panel indicates with bright regions where are large contrasts in the corresponding horizontal strip of the image. The third panel includes the subset of the bright regions of the second panel that survive predetermined region of interest masks. The lines on the bottom panel where the algorithm determined that lanes were present in the image. As noted above, these examples illustrate common problems with classic lane determination algorithms. In FIG. 1A, the left lane line is drawn on top of the curb, and not the solid yellow line on the left where it should have been drawn. In FIG. 1D, the left lane line is drawn over a crack in the windshield. In FIG. 2A, the left lane line is drawn through some reflections on the hood of the car To further illustrate a typical challenge sequential lane determination technique, FIG. 2A highlights a challenging assignment problem. After putative points or segments of a lane are detected, some subset of the points and/or edges may then be assigned to one or more curves corresponding to detected lane boundaries. Errors in this step may be referred to as assignment errors. One error of this type may include mistakenly assigning a point that in reality is associated with a first lane to a lane that mainly comprises points from a second lane. Another error of this type may include mistakenly assigning a group of detected points to a "lane" that does not actually correspond to a lane boundary in the real world. In the example illustrated in FIG. 2A, visual data were captured by a camera that was mounted on the windshield of car having a shiny front hood. The visual data was collected at night time. In this situation, the reflection of headlights on the roof of the hood are some of the more salient high-contrast edges in the scene. The actual left lane boundary is relatively faint in this image. In this example, the actual lane boundaries were actually suppressed the candidate lane boundary detection step because they were relatively low-contrast compared with the reflections on the hood. The sequential algorithm attempts to pick a subset of the reflected spots on the car's own hood to determine the left lane boundary. The resulting detected lane is about half of the actual width of the driver's lane.

FIG. 2B illustrates the same scene with the output of a curve determination system in accordance with certain aspects of the present disclosure. In FIG. 2B, the left lane is correctly identified. As a consequence, an IDMS system in communication with the curve determination system can ascertain that the monitored driver is tailgating another car at an unsafe following distance.

As illustrated by this first example, certain aspects of the present disclosure are directed to determining a curve in a way that may avoid some of the errors that are associated with sequential processing techniques. In addition, accordance with certain aspects of the present disclosure, a lane determination system may be trained so that it becomes increasingly robust to challenging lane detections situations. As will be illustrated in the next section, a lane detection system that was configured according to certain aspects of the present disclosure may successfully detect lane markings that are not clearly visible and/or that are occluded by other cars on the road.

Determining a Curve in Visual Data

Several systems and methods for determining a curve are contemplated. Determining a curve may include detecting that a curve is present and parameterizing the curve. Parameterizing the curve may be referred to as curve-fitting. As with the previously described examples, detection and curve fitting may be done sequentially and may improve such systems and methods. To illustrate a unique advantage of certain aspects of the present disclosure, however, the following describes an embodiment in which these two steps may be performed at substantially the same time.

In one example, visual data, such as an image, may be processed with a neural network. The outputs from a single forward pass of the neural network may determine a curve associated with a lane boundary. For example, the outputs from the neural network may indicate both the likelihood that a lane is present in a particular portion of the image and one or more parameters corresponding to a parameterization of that curve.

In some examples, a system or method may be configured so that a curve is determined to be present in a particular portion of an image if a tangent line extending from the bottom of the curve would pass through that portion of the image.

Furthermore, in some embodiments of certain aspects of the present disclosure, multiple curves may be determined (detected and parameterized) based on the same outputs of a single forward pass of a neural network. Each of the multiple curves may correspond to lane boundaries, road boundaries, or other types of curves for which the neural network may have been trained. By determining if a curve is present and determining a parameterization of the curve at substantially the same time, some of the identified shortcomings of sequential lane determination techniques may be avoided.

Figure 3A:
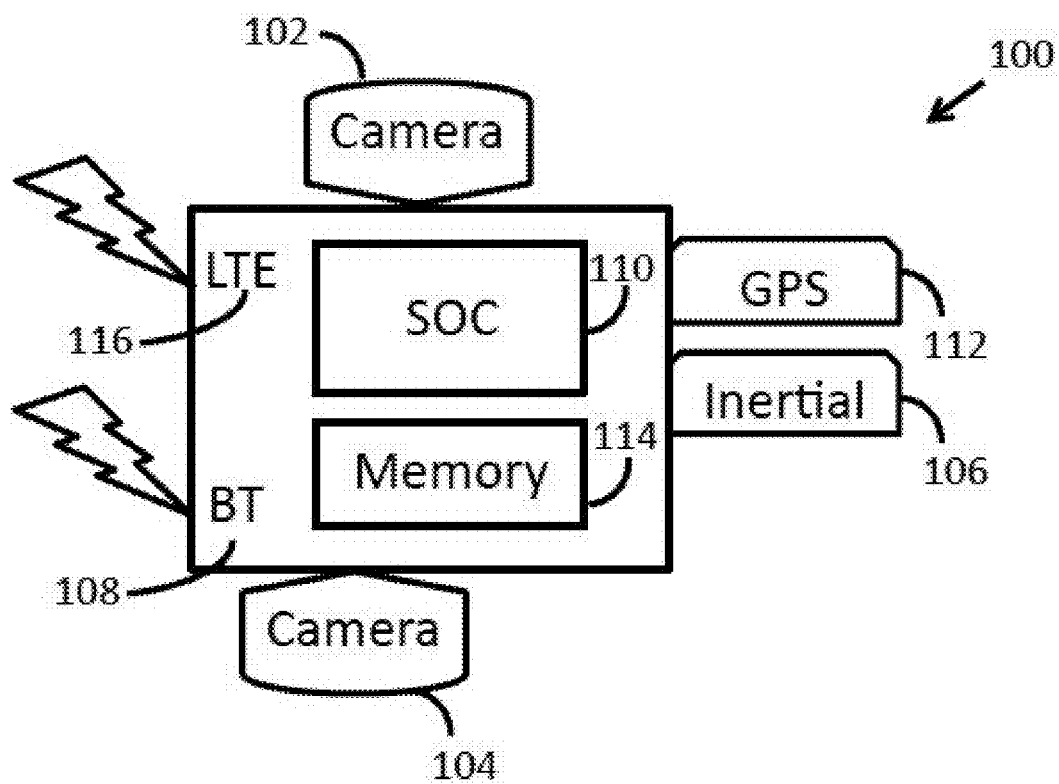
FIG. 3A illustrates an example of a method for determining a curve in accordance with certain aspects of the present disclosure.

FIG. 3A illustrates and example of a system of curve determination in accordance with certain aspects of the present disclosure. The device 100 may include input sensors (which may include a forward-facing camera 102, a driver facing camera 104, connections to other cameras that are not physically mounted to the device, inertial sensors 106, car OBD-II port sensor and vehicle data (which may be obtained through a Bluetooth connection 108), Lidar, radar, and the like) and compute capability 110. The compute capability may be a CPU or an integrated System-on-a-chip (SOC), which may include a CPU and other specialized compute cores, such as a graphics processor (GPU), gesture recognition processor, and the like. In some embodiments, a system or method for mapping a determined path of travel may include wireless communication to cloud services, such as with Long Term Evolution (LTE) 116 or Bluetooth 108 communication to other devices nearby. In addition, LTE 116 or Bluetooth 108 communication may be used to gather data from disaggregated sensors, which, in some embodiments may include Lidar, radar, and the like. The device may also include a global positioning system (GPS) either as a separate module 112, or integrated within a System-on-a-chip 110. In some embodiments, a disaggregated sensor, such as Lidar, radar, or GPS may communicate directly to the device 100, may communicate to the device via an intermediary processing unit, may communicate to the device via a cloud server, may communicate to a cloud server for further processing, possibly in combination with data communicated to the cloud from the device 100. For example, the cloud may provide real-time analytics assistance. In an embodiment involving cloud services, the cloud may facilitate aggregation and processing of data for offline analytics or for training of machine learning models. The device may further include memory storage 114.

Figure 3B:
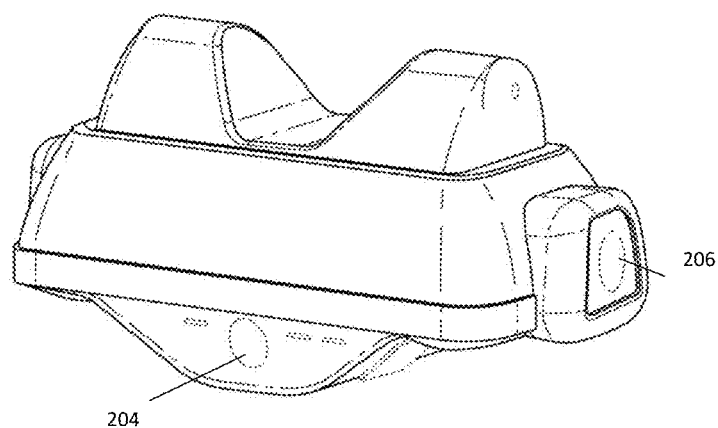
FIG. 3B illustrates an example of a method for determining a curve in accordance with certain aspects of the present disclosure.
Figure 3C:
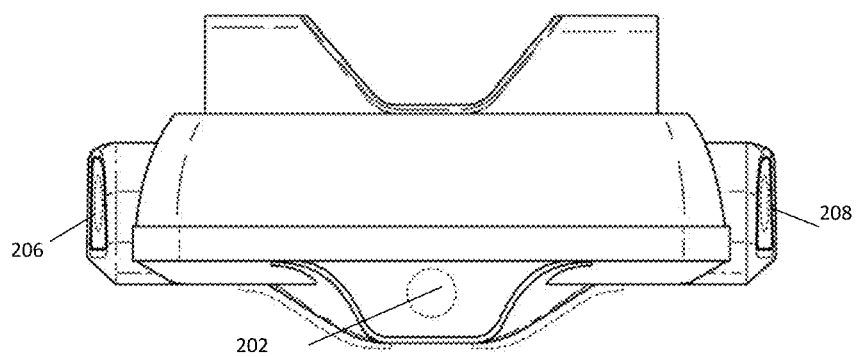
FIG. 3C illustrates an example of a method for determining a curve in accordance with certain aspects of the present disclosure.

FIGS. 3B and 3C illustrate an example of a device having four cameras implementing a method of curve determination in accordance with certain aspects of the present disclosure. FIG. 3B illustrates a front perspective view of the system 100 for capturing and/or modifying a video according to a desired privacy in accordance with certain aspects of the present disclosure. FIG. 3C illustrates a rear view of the system 100 of FIG. 3B in accordance with certain aspects of the present disclosure. In one embodiment, the system 100 includes a body 200, apertures 202, 204, 206, 208, and a mount 222. The cameras (or image sensors) may be located at corresponding apertures, and the body 200 may be coupled to a vehicle through the mount 222. In this configuration, when the system 100 is coupled to the vehicle, the system 100 can capture a view of the driver of the vehicle as well as the visual field accessible from the point of view of the driver. In other embodiments, the system 100 includes fewer, more, or different components than shown in FIGS. 3B and 3C.

The body 200 is a mechanical housing that covers cameras and other electronic components. In one aspect, the body 200 encloses electronic components such as long-range wireless communication device 116, short range wireless communication device 108, SOC 110, memory 114, and other sensor devices 112, 106. The body 200 includes at least a top surface 220, a front surface 212, a rear surface 214, a first side surface 216, and a second side surface 218. In addition, the body 200 covers cameras, where each camera is located at a corresponding aperture. For example, the forward-facing camera 102 of FIG. 1 is located at an aperture 202 of the front surface 212; the backward-facing camera 104 of FIG. 1 is located at an aperture 204 of the rear surface 214; a first side-facing camera (not shown) is located at an aperture 206 of the first side surface 216; and a second side-facing camera (not shown) is located at an aperture 208 of the second side surface 218. Mount 222 is coupled to a top surface 220 of the body 200. The mount 222 may couple to (or decouple from) a corresponding mount on a windshield of a vehicle. In this configuration, the body 200 can be attached to or detached from the windshield. In other embodiments, the body 200 may be coupled to a different mount than shown in FIG. 2, and directly coupled to the windshield. In other embodiments, the body 200 may be coupled to a rear-view mirror of the vehicle or integrated with the rear-view mirror.

When the body 200 is mounted on the vehicle, the forward-facing camera 102 can capture images or videos of a road ahead of the vehicle through the aperture 202 to generate corresponding image data or video data. Similarly, the backward-facing camera 104 can capture images or videos of inside of the vehicle through the aperture 204 to generate corresponding image data or video data. The image data or the video data generated by the backward-facing camera 104 may be used, for example, to monitor the operator of a vehicle. In addition, the first side-facing camera can capture images or videos of a first side (e.g., right side) of the driver's point of view through the aperture 206 to generate corresponding image data or video data. Similarly, the second side-facing camera can capture images or videos of a second side (e.g., left side) of the driver's point of view through the aperture 208 to generate corresponding image data or video data. By aggregating different image data or video data from different point of views, a driver's behavior in response to surroundings of the vehicle may be determined.

Figure 4:
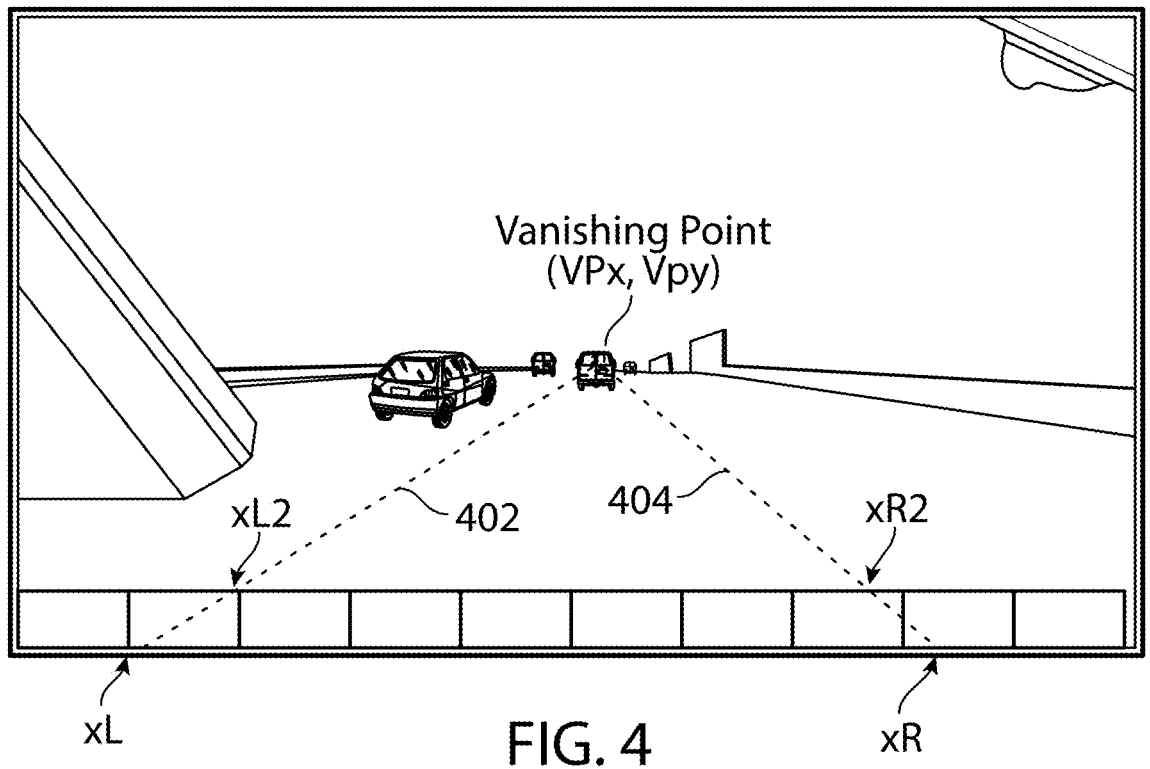
FIG. 4 illustrates an example of a method determining a curve in accordance with certain aspects of the present disclosure.

FIG. 4 illustrates detection and a parameterization of two curves in an image. The image was captured from a camera mounted to the windshield of a car. A first curve 402 corresponds to the left lane boundary of a monitored driver and a second curve 404 corresponds to a right road boundary of the monitored driver.

The bottom of the image is shown divided into ten boxes for which lanes might pass through. These ten boxes may be referred to as curve detection boxes or predetermined rectangular portions of the image. In an embodiment of certain aspects of the present disclosure, a neural network may be configured to determine a probability that a curve is present in an image (curve detection) and that it passes through one of the ten boxes at the bottom of the image at a particular point. The neural network may also, at substantially the same time, separately determine parameters of the one or more curves (curve fitting). In one embodiment, the neural network may determine the points at which the curve enters and exits the box in which it detected. In some embodiments, the network may be configured to determine a probability that the curve is present and that it passes through the bottom boundary of a rectangular region, which may similarly be considered to pass through a region of the image corresponding to a single straight line (i.e. the bottom of one of the rectangular boxes illustrated in FIG. 4).

The width of the boxes may be sized to be less than a typical distance between two lanes so that it may reasonably be expected that only one lane boundary will pass through a given box in a single image. In this example, the width of the image is split into ten equally spaced segments. In subsequent examples, described below, narrower boxes are used so that the bottom of the image is divided into twenty segments. In addition, non-uniform segment lengths may be used.

In FIG. 4, the curve 402 is shown passing through the second box from the left at a point that may be denoted xL, for x-position of the intercept with the bottom of the image for the Left lane boundary. Likewise, the curve 404 is shown passing through the ninth box from the left at a point that may be denoted xR, denoting the x-position of the intercept with the bottom of the image for the Right lane boundary. The curves 402 and 404 both extend upwards in the image to a Vanishing Point. The curve 402 extends through the top of the boxes at a point that may be denoted xL2. The curve 404 extends through the top of the boxes at a point that may be denoted xR2. In this example, each curve 402 and 404 is a straight line. Although the present example illustrates a curve having zero curvature (that is, "straight" curves), determinations of non-straight (i.e. "curved") curves are also contemplated.

In this example, the detected curves 402 and 404 may be fully specified by the regression points. For example, the curve 402 is a straight line that extends from the point (xL, imgHeight) to (VPx, VPy), and the curve 404 is a straight line that extends from the point (xR, imgHeight) to (VPx, VPy). These curves may be fully specified in this manner owing to the typical properties of lanes on roads, being parallel to each other and straight. As discussed below, the parameterization of a curve may also be extended to incorporate additional parameters to capture curvature of lane or road boundaries, lane attributes, and the like.

The example shown in FIG. 4 illustrates ten horizontal boxes, each of which may be used as a reference point for a curve in the image. Other configurations are also contemplated. In addition to the ten boxes illustrated at the bottom of the image, boxes may extend beyond the boundaries of the image. In one exemplary system, twenty equally sized boxes may be arranged on either side of the image. A curve may be considered to pass through a box that is beyond the boundary of the image if a tangent line extending from and end of the curve passes through the box that is positioned beyond the boundary of the image.

The curve detection boxes may be placed at locations above the bottom of the image, at positions, that wrap around the sides of the image, and the like. As road lanes may appear closer together when viewed from higher locations, such as from the windshield of a truck rather than a passenger car, it may be desirable to configure a system of lane determination to have narrower widths that wrap around the edge of an image for intended use by a truck.

Figure 5:
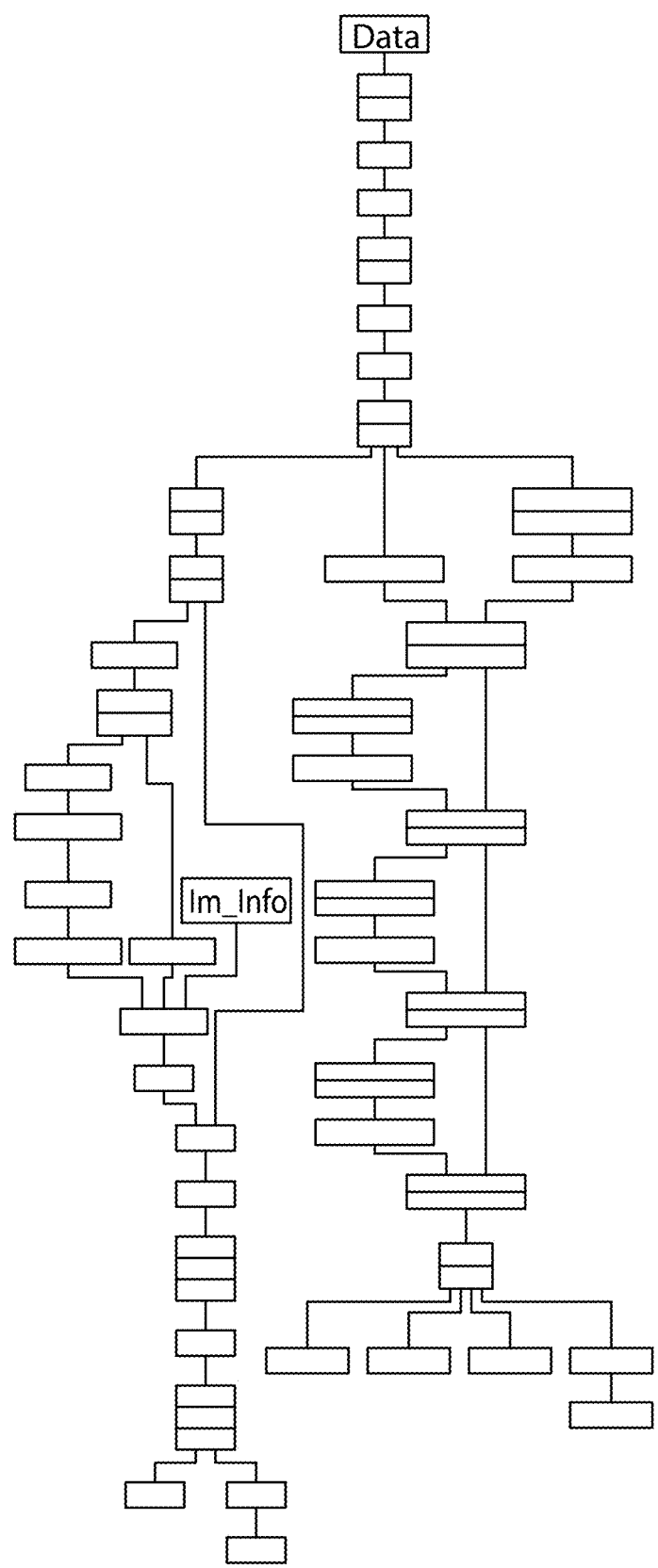
FIG. 5 illustrates an example of a method of determining a curve in accordance with certain aspects of the present disclosure.

FIG. 5 illustrates a schematic of a neural network, which may be a deep neural network (DNN) that detects and parameterizes one or more curves in visual data at substantially the same time. Separate DNN outputs provides a regression point at which a lane passes through the bottom and top of a corresponding box. In this example, an object detection branch on the left and a curve determination branch on the right, may share a common trunk at the top. Accordingly, the processing steps associated with either of these processing steps is actually the same for the neural network layers before the branch point. After the neural network separates into separate heads, the corresponding computations may be performed in parallel. In some embodiments, the processing associated with each head of the neural network may be performed sequentially but in an arbitrary order owing to the fact that the data flow is feedforward at this stage.

Figure 6:
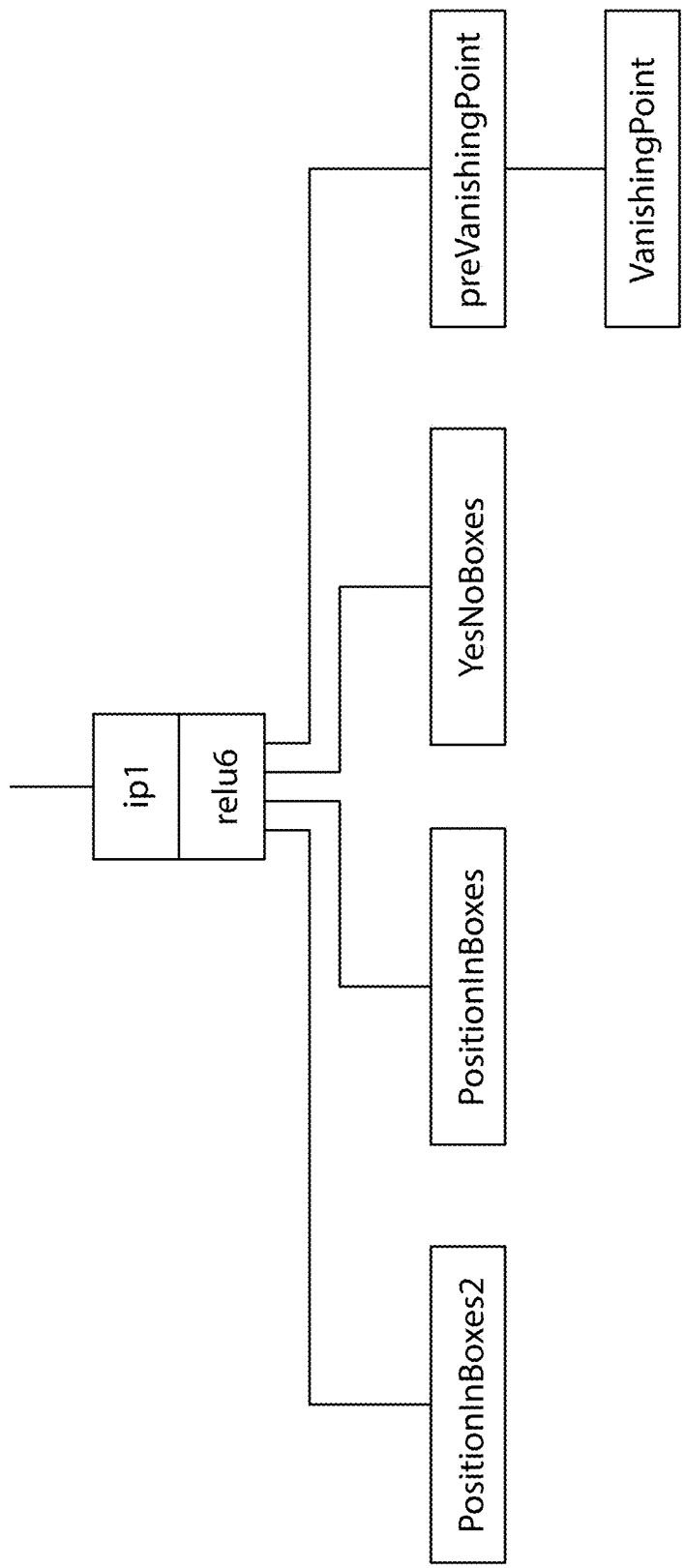
FIG. 6 illustrates an example of a method for determining a curve in accordance with certain aspects of the present disclosure.

The object detection network in this example may identify cars and trucks or other objects that may be commonly observed from a vehicle-mounted camera. The combined DNN architecture may be advantageous for at least two reasons. First, cars and trucks may be useful context cues that may help the network identify lane locations. Second, by sharing the same trunk, some of the time-consuming processing of images may be performed only once instead of twice. This may lessen the amount of processing time for the entire system, thereby enabling a higher frame rate. A higher frame rate may bring additional advantages such as reducing the complexity of a subsequent tracking algorithm. The complexity of a tracking algorithm would be reduced because the faster frame rate would imply that the objects being tracked are closer together than they would be for two sequentially processed frames at a lower frame rate FIG. 6 illustrates a detailed view of the curve determination head of the neural network shown in FIG. 5. In this example, "YesNoBoxes" may comprise 50 nodes, each computing a likelihood that a curve is present in a corresponding box, as described above. In addition, "Position in Boxes" is a layer of a neural network having 50 nodes. Each node may provide the location within a YesNoBox at which the curve (if present) would pass through the bottom of the box (or at which a tangential line extending from the curve would pass through the bottom of the box). This value would correspond to the points marked xL or xR in FIG. 4, after taking into account the offset of the corresponding YesNo-Box. "Position in Boxes2" is similar to "Position in Boxes" but may instead compute a value at which the curve exits the top of the corresponding YesNoBox. In this example, the DNN output may also provide an estimate of the vanishing point location. Although the vanishing point could also be inferred from the slopes of detected curves (in the case that the detected curves correspond to parallel lines), it may be desirable to train the neural network to output the vanishing point as well. For example, this may provide an additional teaching signal to the network that may enable faster training times. For a neural network that additionally outputs the Vanishing Point, a single curve may be determined as extending from the location indicated by a "Position in Boxes" value to the estimated Vanishing Point location.

Figure 7:
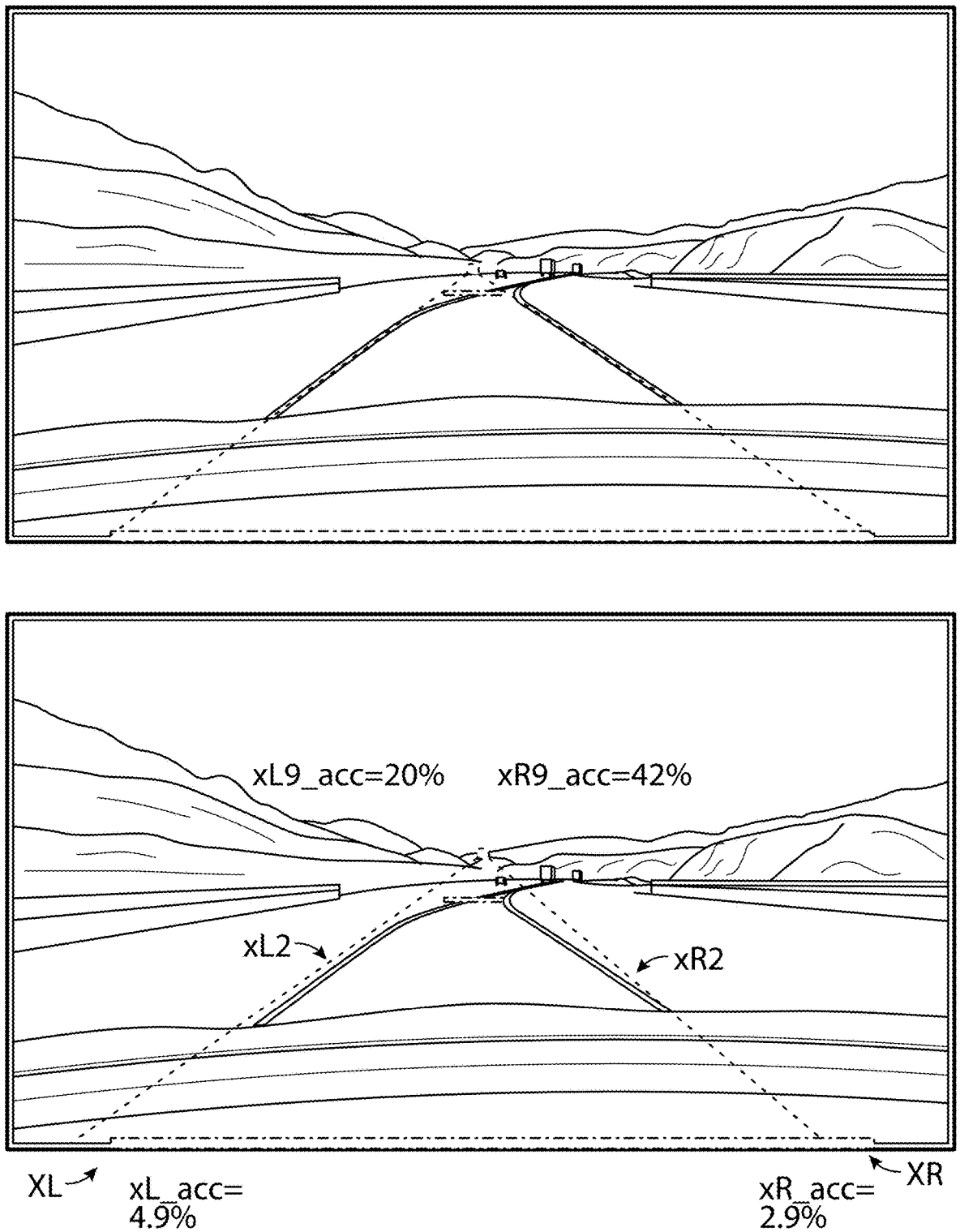
FIG. 7 illustrates an example of a method for determining a curve in accordance with certain aspects of the present disclosure

FIG. 7 illustrates a metric of curve determination accuracy in accordance with certain aspects of the present disclosure. In this example, the thin dashed-dotted rectangles indicate the width of the monitored driver's lane at two distances away from the camera. The lane at the distance corresponding to the bottom of the image is much wider than the width (in pixels) of the lane near the vanishing point. However, the actual width of the lane in this example remains constant. As is typical for highway lanes in the United States, this lane is 12 feet wide. The ground truth lane detections are shown on the top panel. The bottom panel shows the output of a DNN from a time early in its training. The errors are shown as a function of the lane width at a location at the bottom of the image and at a point 9/10ths of the way up to the vanishing point. As can be seen, an error of a small number of pixels near the vanishing point may correspond to a large error as a proportion of lane width.

Other systems and methods of curve determination are also contemplated. In one example, a method of lane determination may be configured without a separate lane detection output. Such a neural network system may be configured so that it identifies two lane boundaries in each frame, corresponding to the left and the right lane boundaries of the monitored driver's lane. In this example, unlike the previous example, there may be no separate estimate of a probability that a lane boundary is present.

This approach, however, may have certain undesirable features. First, the system may only identify two lane boundaries in an image and may thereby ignore other plainly visible lane and/or road boundaries. Second, such a system may always output its best guess of lane boundary locations, even when presented with images that do not have any lanes in them. Examples of this situation may include an unmarked parking lot, the middle of a large intersection, and the like.

Furthermore, a curve determination system configured to output two lane boundaries in every frame might exhibit undesired features that may frustrate machine learning techniques. In particular, the definition of the left versus right lane boundary may sometimes be ambiguous. As may be appreciated especially with regard to lane changes, as the driver crosses over a lane boundary, the formerly left lane boundary will become the right lane boundary. After this transition, the formerly right lane boundary should not be output such a system and the new left lane boundary should be reported in its stead. This discontinuity could be sensitive to small errors around the time of a lane change. During training, a learning system may be unfairly penalized for identifying a lane boundary as a right lane boundary when it is really a left lane boundary and vice versa.

Figure 8:
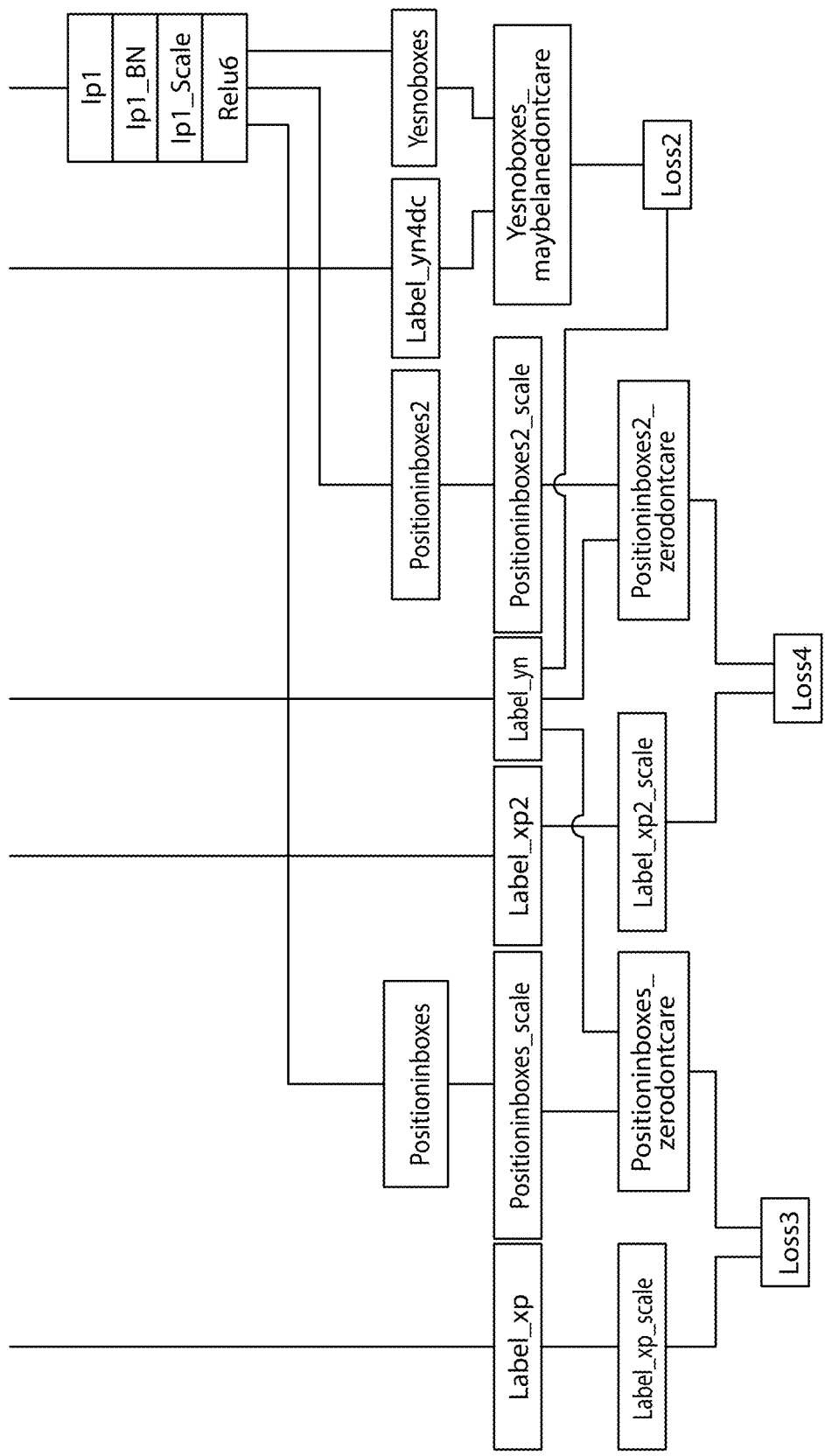
FIG. 8 illustrates an example of a method for determining a curve in accordance with certain aspects of the present disclosure

FIG. 8 illustrates a detailed view of the curve determination head shown in FIG. 6, configured with training layers for a training phase. FIG. 8 includes a "YesNoBoxes_MaybeLaneDontCare". This layer may indicate that certain regions of the image may or may not contain a curve, and that the DNN should not be penalized for either guess. This may be useful if the training data contains labels in which only a subset of the visible lanes are labeled. For example, only the lane boundaries near the monitored driver may be labeled in some portion of the dataset.

The YesNo labels ("label_yn") may be provided to multiple output layers. By multiplying the regression outputs from PositionInBoxes and PositionInBoxes2 with label_yn, all of the regression boxes associated with curves that are not present in the image may be set to zero. As a consequence, regression guesses associated with lanes that are not present may not flow backwards through the network in a backward pass. In this way, training a regression value associated with a detected lane (where the lane is) may be decoupled from training a probability of lane detection (if the lane is present).

Data augmentation may also be a useful technique for curve determination. Image data may be artificially cropped and or stretched. In these cases, the curves that are present in the training data may be correspondingly transformed. Pan augmentation may emulate different mounting positions across a windshield. The camera system need not be mounted in the center of a windshield. For an after-market device in particular, it may not be practical to mount the camera in the center of the windshield. Zoom augmentation may account for different camera lenses and zoom settings. Squish/Smoosh augmentation to emulate higher and lower camera positions.

Several methods of labeling curves in visual data are contemplated. In this example, two lane markings may be identified for each lane, after which a labeling system draws may draw a straight line through the identified points. A second line corresponding to a parallel curve may be identified in the same manner. Since the two identified lines are parallel in the real world, extensions of the two lines will meet at a Vanishing Point in the image.

Figure 9:
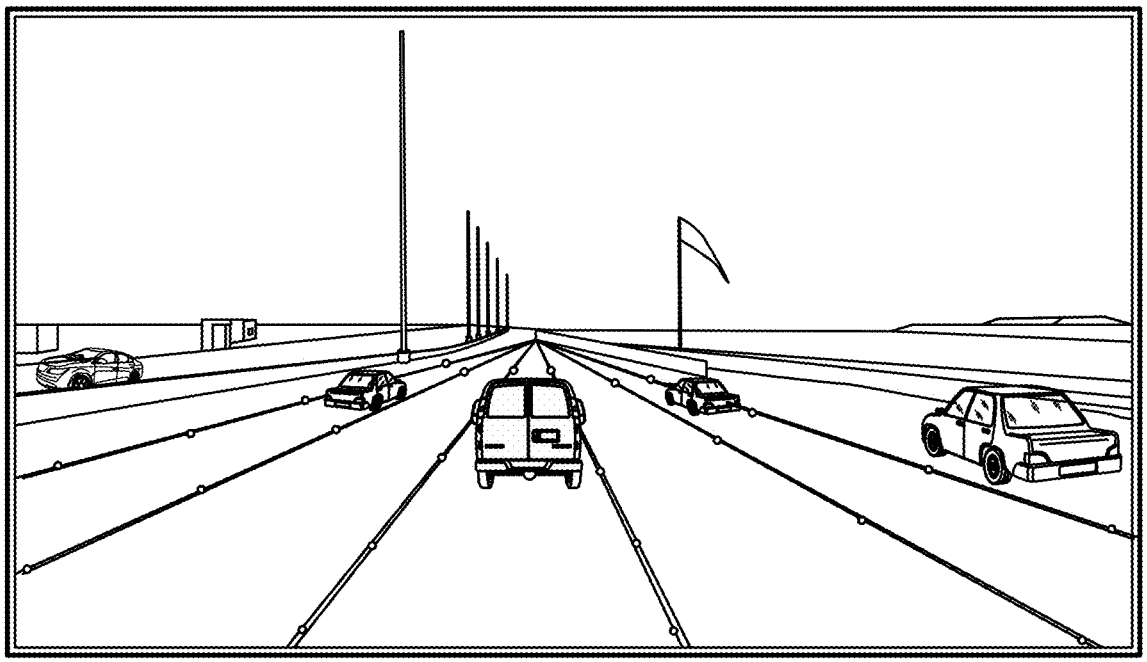
FIG. 9 illustrates an example of a method for determining a curve in accordance with certain aspects of the present disclosure

FIG. 9 illustrates an example of a labelled image that may be used to train a neural network to perform lane determination in accordance with certain aspects of the present disclosure. In the example shown in FIG. 9, each identified lane may be indicated in the manner described above. In this example, however, rather than connecting the curves at a vanishing point, a labeling system may provide two additional control points between the identified points. The labeler may then move the control points to match curvature in the identified curve. Accordingly, a DNN may be configured and trained to output relative positions of control points. Alternatively, or in addition, curved lanes may be determined using a piecewise combination of multiple crops of an image using the linear lane detection method described above.

The control points may correspond to Bezier curves. Lanes may be indicated by two lane points and two control points. The control points may be defined in polar coordinate (angle and magnitude relative to one of the anchor points). In some training configurations, gradients associated with magnitudes may be scaled according to how much the correct angle deviates from the line between the control point and the two anchor points.

In addition to matching the curvature of a detected curve, a labeling system may provide for the specification of lane or road boundary attributes. Lane Classification (solid, yellow, carpool) attributes may be handled by a separate, but linked set of binary classifiers. In one example, a set of binary attribute flags "(1,1,1)" may indicate a "solid", "yellow", lane that is part of a "carpool" lane. Other attribute fields may include relative positional information, such as: "ego", "ego adjacent", "left" and "right". As with the regression coefficients described above, the gradients of the lane identities may only be passed back to the network for training examples that actually have a lane passing through the corresponding box.

Furthermore, a labeler may indicate an "inferred" lane based on a row of parked cars. These lane markings may be associated with lower accuracy than typical lane markings. The errors associated with these regression coefficients of inferred lanes may be configured to be relatively less.

Figure 10:
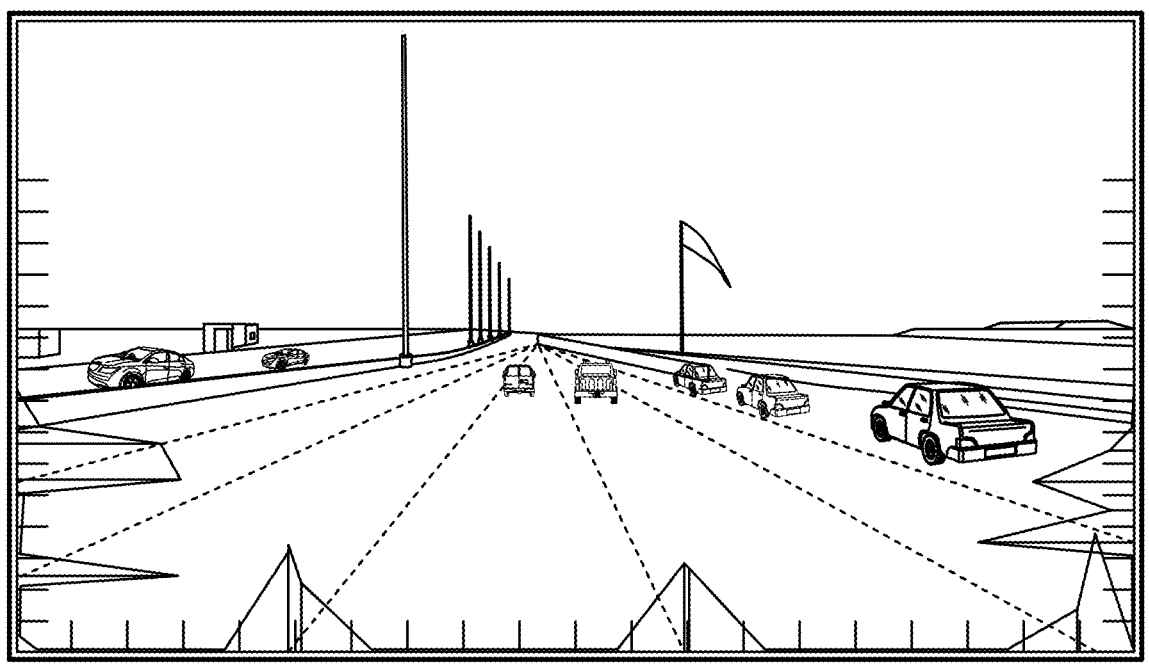
FIG. 10 illustrates an example of a method for determining a curve in accordance with certain aspects of the present disclosure

FIG. 10 illustrates an example of output from a neural network trained to perform curve determination (lane and road boundary determination) in visual data, in accordance with certain aspects of the present disclosure. In this example, the image 1000 was captured from substantially the same location as the image 900, but at a different time of day, and with different lighting and traffic conditions. The pointed lines at the bottom and on the sides of the image correspond to the determined probability that a curve intersects with a corresponding segment of the edge of the image.

Curve Determination in Challenging Situations

While lane determination methods may operate satisfactorily on un-crowded highways where lane markings are clear and present, they may fail to operate satisfactorily in other situations. For example, current lane detection methods may perform poorly in situations in which other high-contrast edges may be observed near real lanes. Current lane detection algorithms, for example, are often confused by other visible straight lines that may be parallel to a lane boundary. Examples of confusing straight lines include a top of a guard-rail, the edge of a long truck trailer, and the like.

Figure 11:
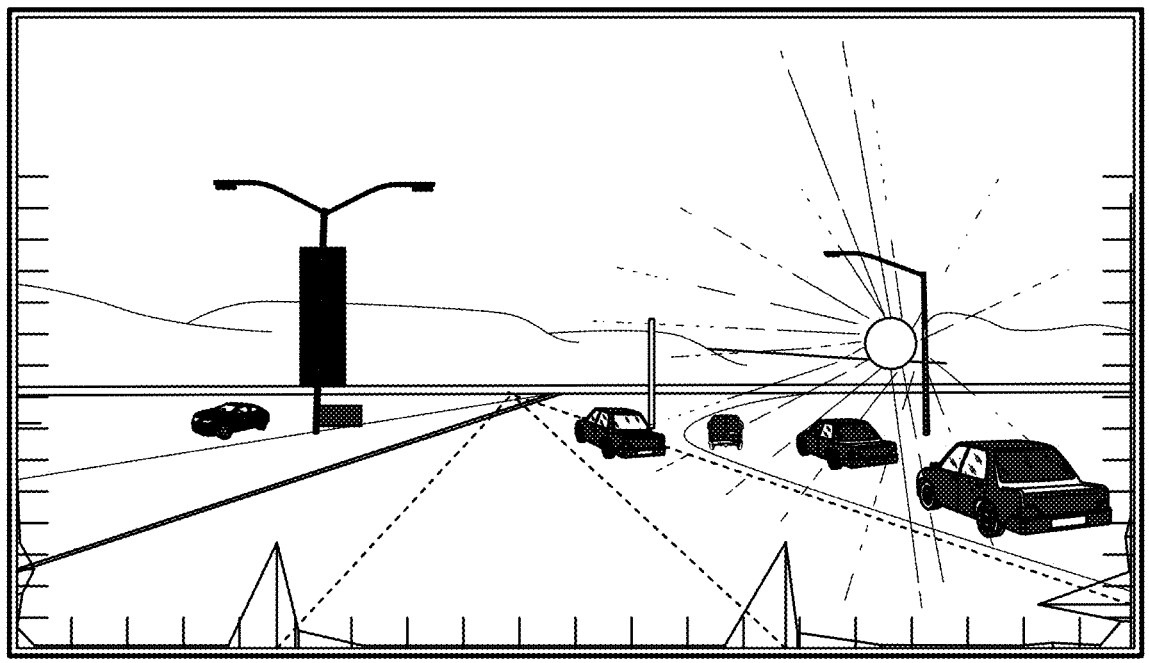
FIG. 11 illustrates an example of a method for determining a curve in accordance with certain aspects of the present disclosure

FIG. 11 illustrates an example of output from the aforementioned neural network in a challenging lighting scenario. In this example, the contrast of the actual lane boundaries is swamped by the light intensity range from the setting sun.

Figure 12:
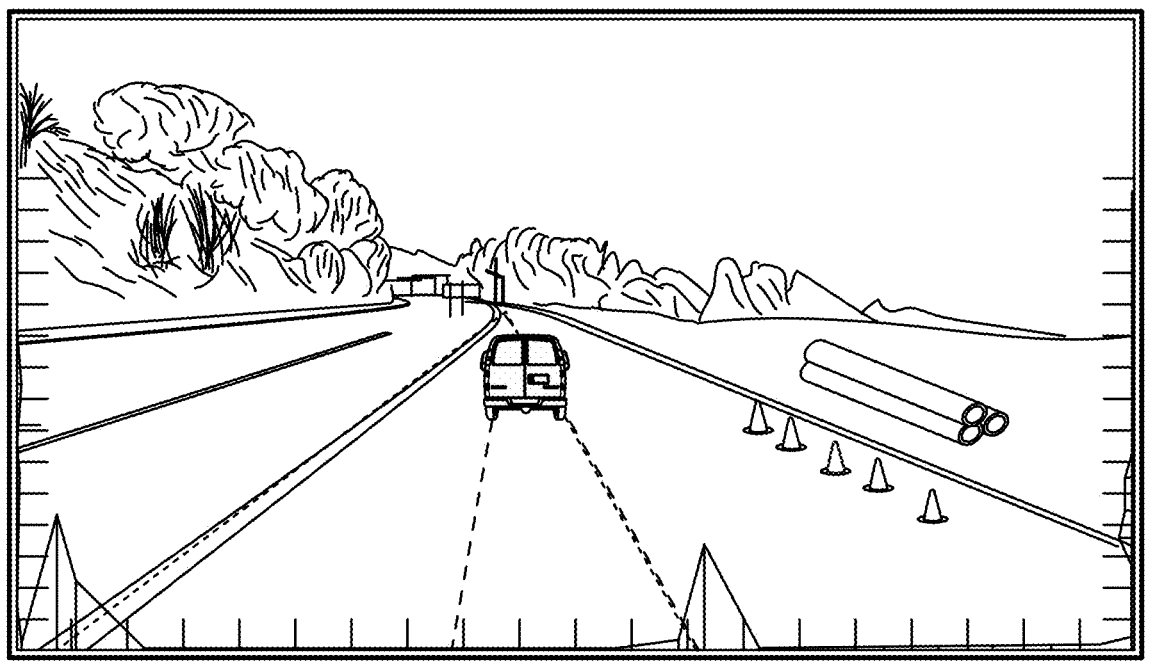
FIG. 12 illustrates an example of a method for determining a curve in accordance with certain aspects of the present disclosure

In another example, current lane detection methods may perform poorly in situations in which visible lane markings are not valid. Near a road construction site, for example, there may be multiple sets of lanes relating to different traffic flows corresponding to different stages of the construction. FIG. 12 illustrates an example of output from the aforementioned neural network in a construction zone.

Figure 13:
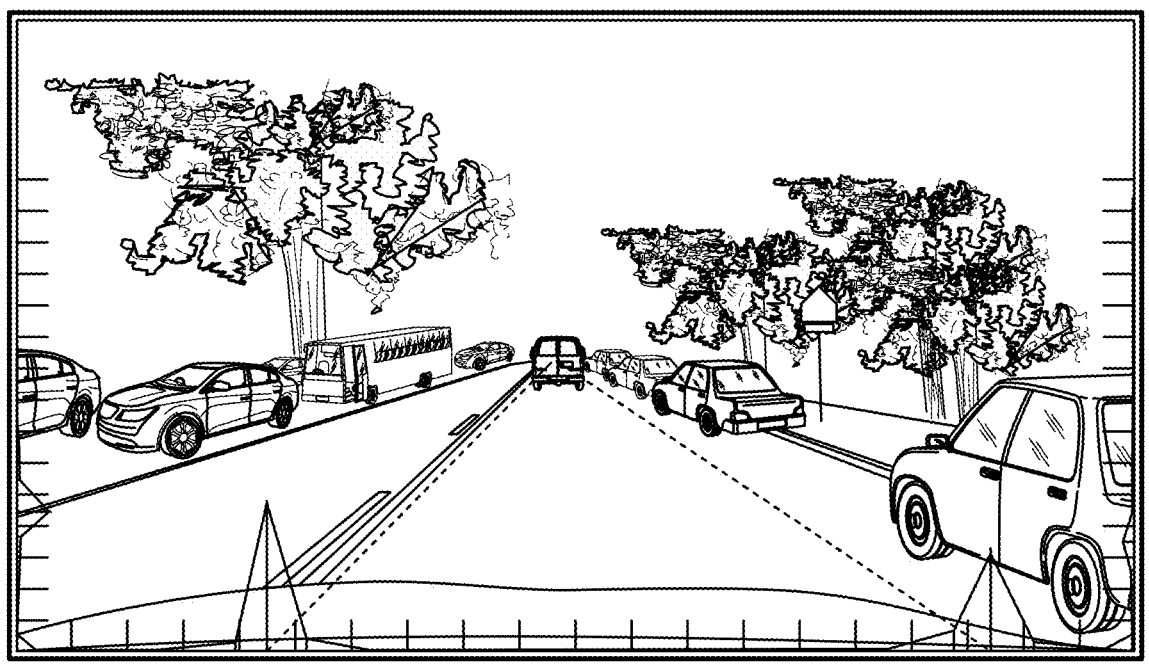
FIG. 13 illustrates an example of a method for determining a curve in accordance with certain aspects of the present disclosure

FIG. 13 illustrates an example of output from the aforementioned neural network in an urban scenario with a row of parked cars on one side that is not separated by lane markings. In this example, current lane detection methods may perform poorly because lane markings are not present in the road. A two-lane urban road with parking available on either side, for example, may have a single lane boundary in the center of the road, and no other lane markings. In these situations, a lane boundary of a driver's lane may correspond to a certain distance away from a row of parked cars. As current lane detection methods may rely on detect lane markings, they may fail to detect such as inferred lane boundary since there are no lane markings to detect.

A system configured according to certain aspects of the present disclosure, however, may detect such inferred lane boundaries even when lane markings are not present. This property of embodiments of certain aspects of the present disclosure indicate that explicit identification of lane markings may not be a component of every lane detection performed by the trained neural network.

Figure 14:
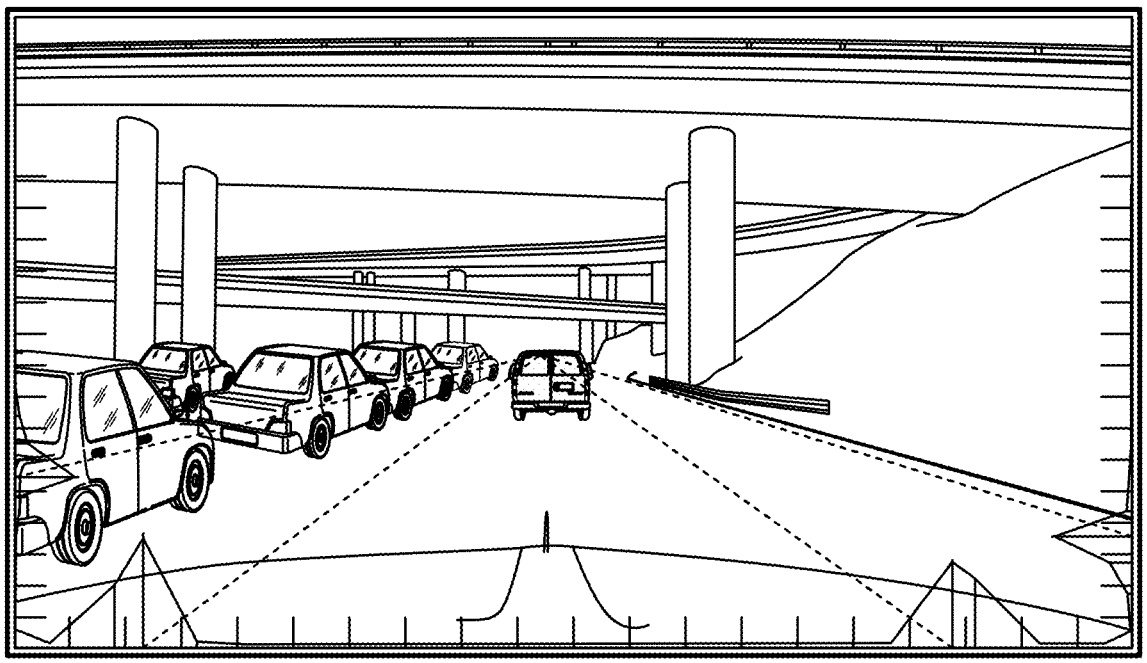
FIG. 14 illustrates an example of a method for determining a curve in accordance with certain aspects of the present disclosure

FIG. 14 illustrates an example of output from the aforementioned neural network in a dense traffic scenario. The system detects a lane boundary for an adjacent lane even when it is entirely occluded by other cars.

Figure 15:
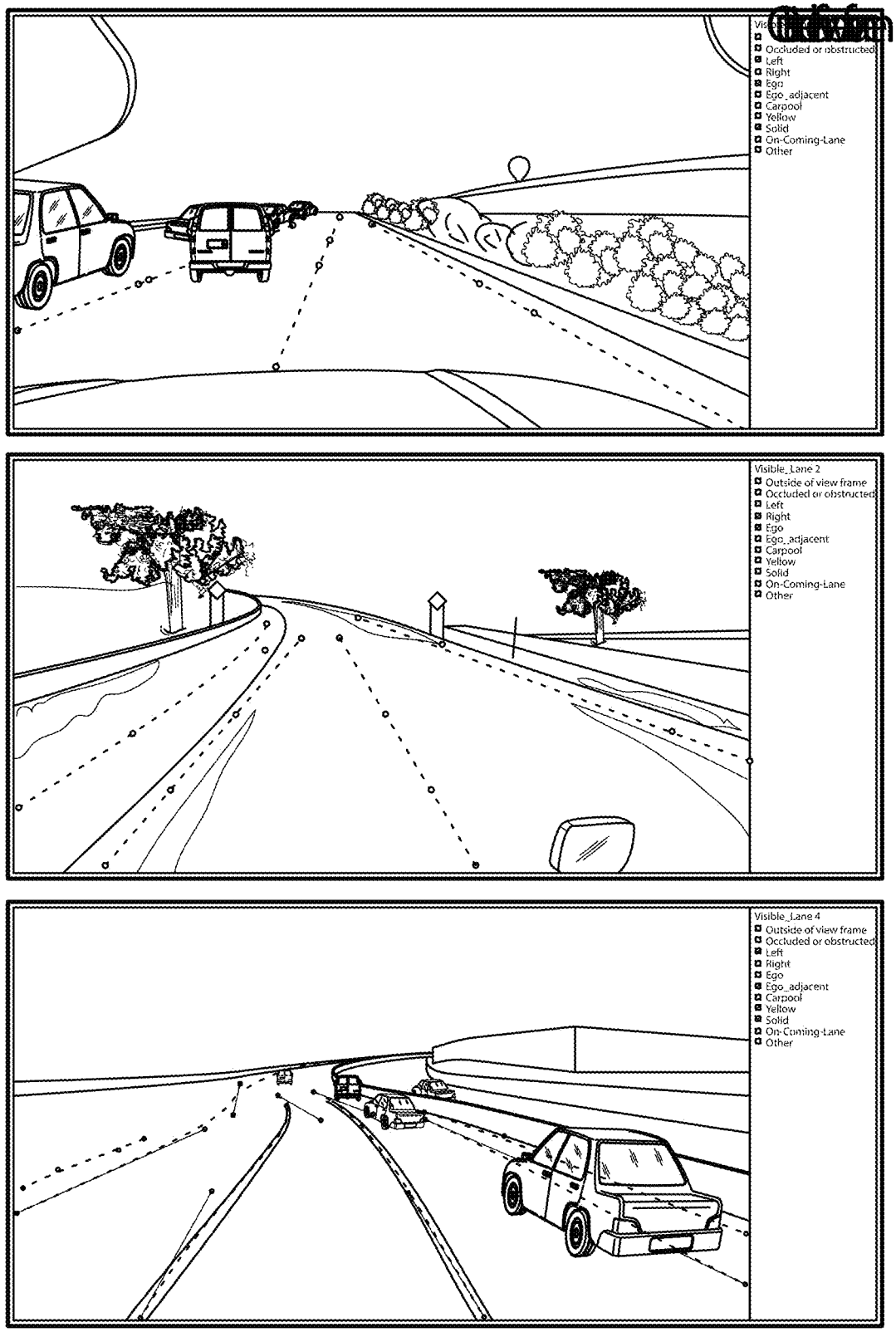
FIG. 15 illustrates an example of a method for determining a curve in accordance with certain aspects of the present disclosure

FIG. 15 illustrates a parameterization of lane boundaries that may incorporate additional curve attributes. Including solid and striped curves, or curves that are comprised of a border between two surfaces (a road surface and dirt). Additional examples include poorly visible lanes covered by snow, and curved lanes in a construction zone.

Figure 16:
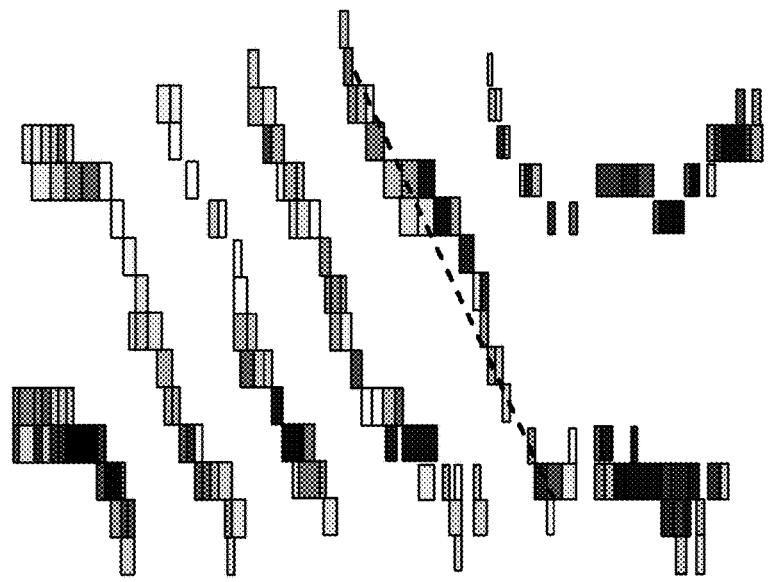
FIG. 16 illustrates an example of a method for determining a curve in accordance with certain aspects of the present disclosure
Figure 16:
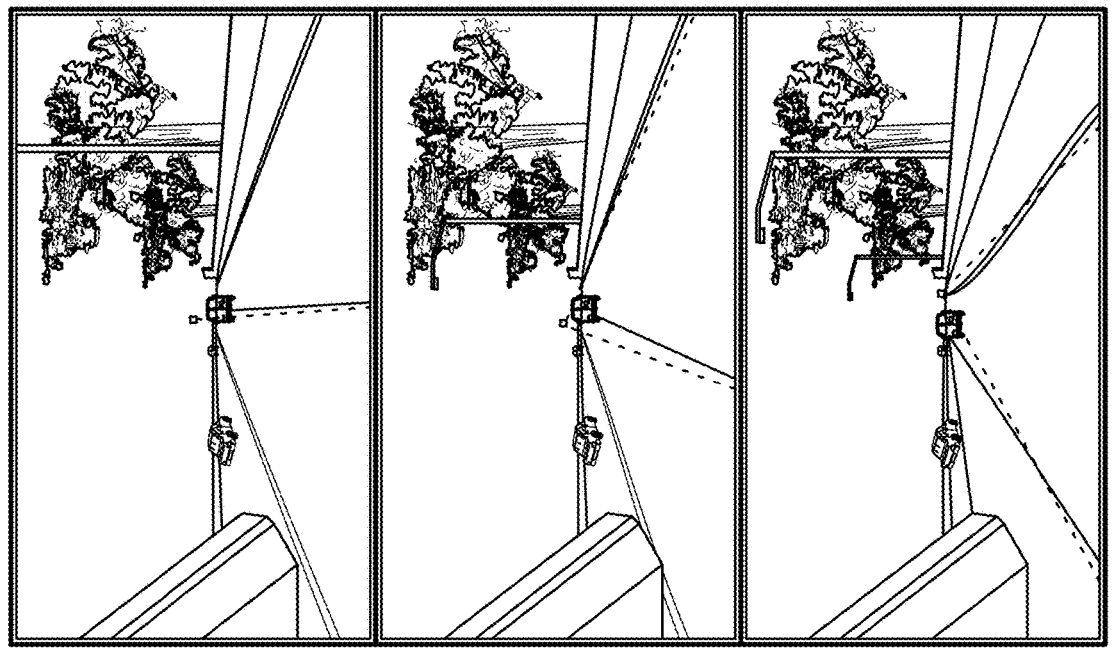

FIG. 16 illustrates the use of outputs from the aforementioned neural network that may be used to determine a driving maneuver. In this example, the monitored driver executes a lane change. The lane change behavior may be determined based on a sequence of outputs corresponding to a sequence of images captured at a camera coupled to the car of the monitored driver.

High-Definition Mapping with Determined Lanes and Road Boundaries

Certain aspects of the present disclosure may be used for high-definition (HD) mapping of curves that may be relevant to driving. From a camera mounted on or near the interior of a vehicle windshield, lanes may be determined. Based on a calibration of certain camera parameters, which may include intrinsic and extrinsic camera parameters, and inverse perspective transform may be determined with which lane boundaries may be projected into a world-based coordinate frame.

Figure 17:
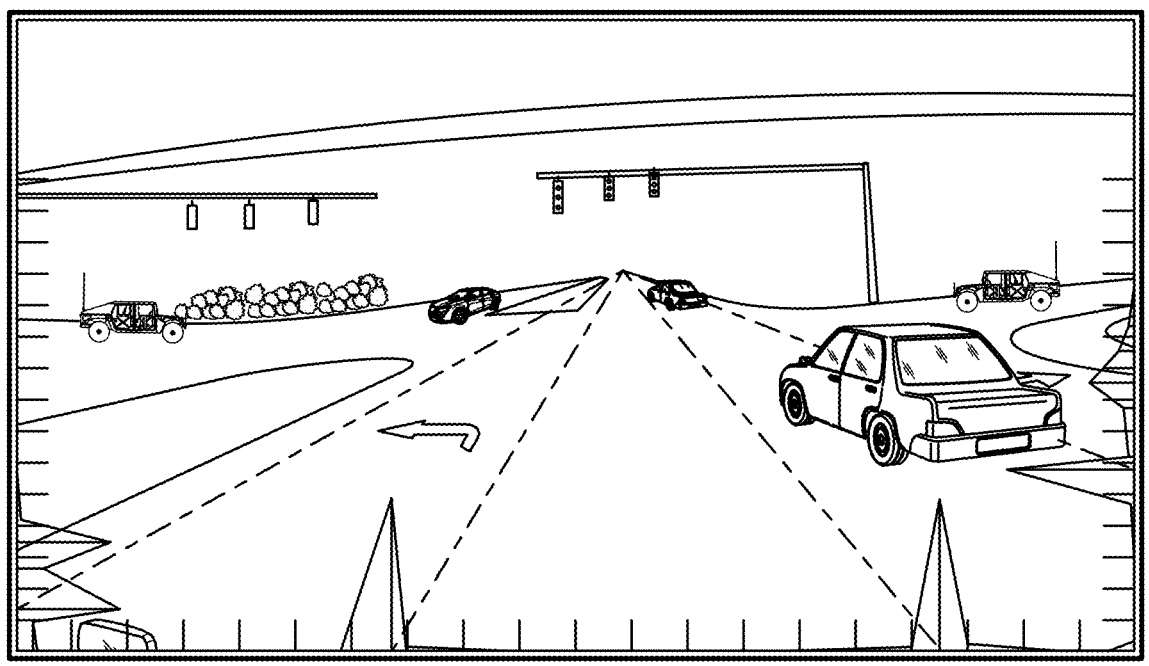
FIG. 17 illustrates an example of a method for determining a curve in accordance with certain aspects of the present disclosure

FIG. 17 illustrates the use of outputs from the aforementioned neural network to determine a lane position in the vicinity of an intersection controlled by a traffic light. In some embodiments, the layout of lanes in the vicinity of a traffic light may be communicated to an enabled device via DSRC, LTE-direct, and the like. The enabled device may then incorporate the communicated information to determine, for example, that the lane to the left of the monitored driver is a left turn lane, and that the monitored driver's lane and the lane to her right are through-traffic lanes.

Figure 18:
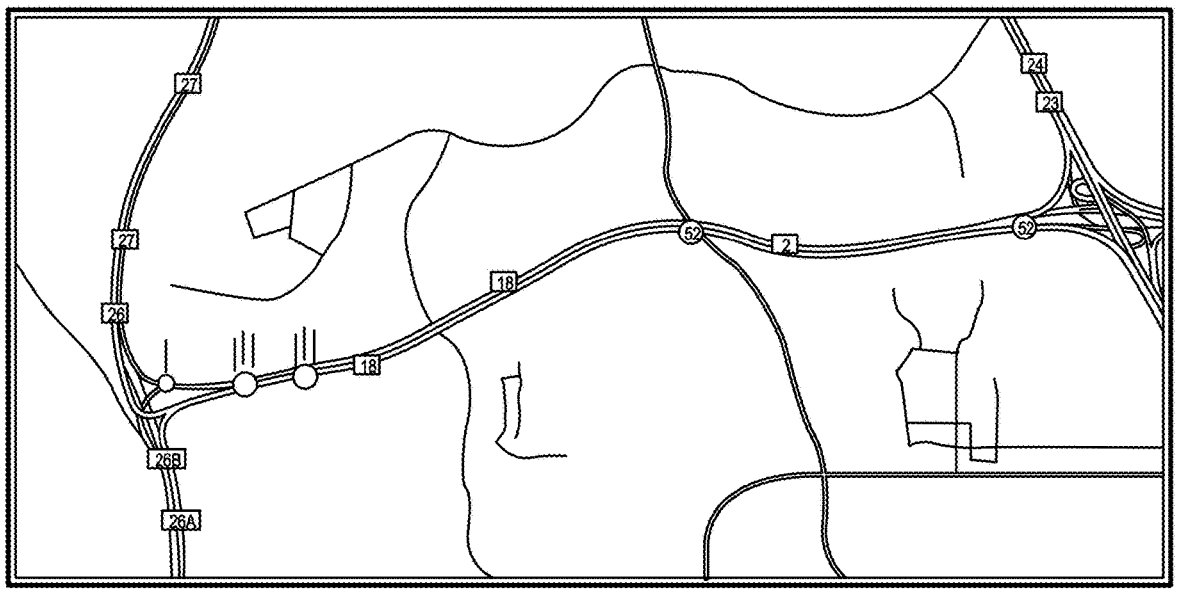
FIG. 18 illustrates an example of a method for determining a curve in accordance with certain aspects of the present disclosure
Figure 18:
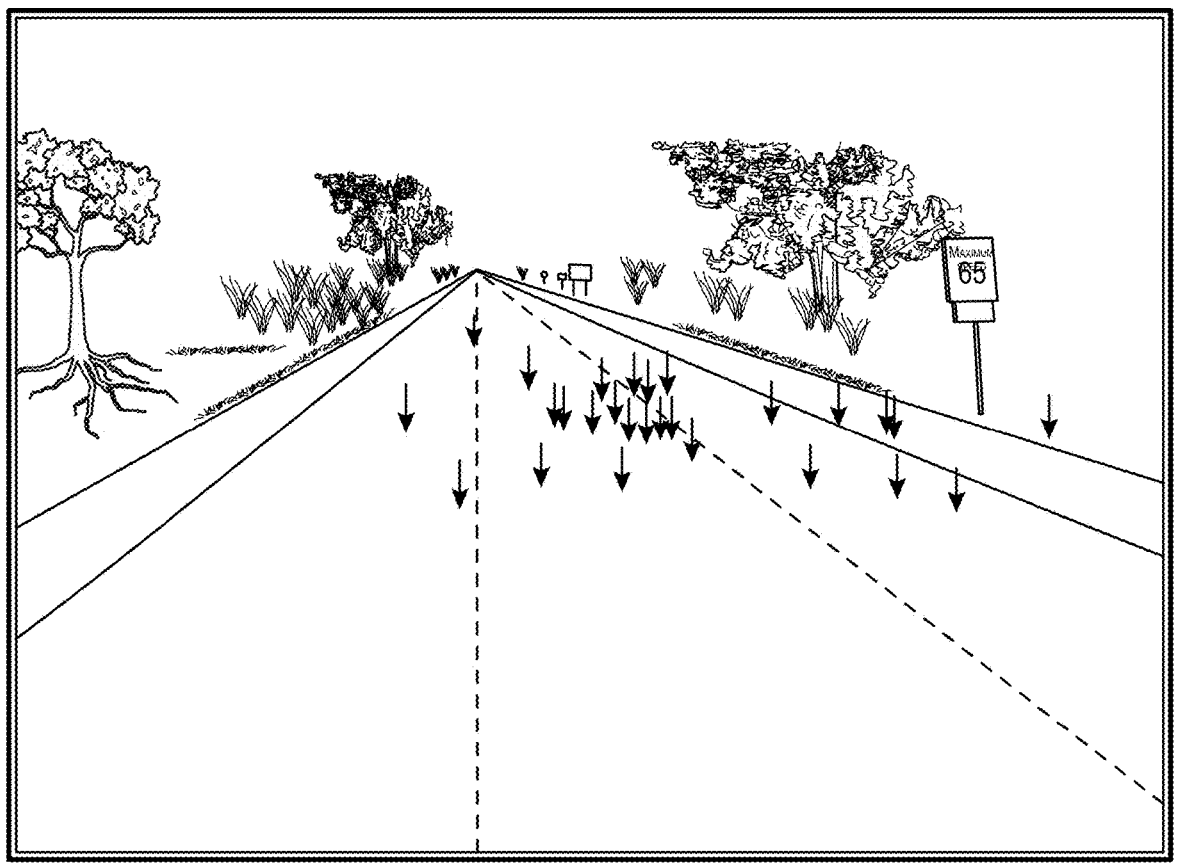

FIG. 18 illustrates the use of outputs from the aforementioned system and methods of curve determination to map landmarks on a road. The markers in the map overview (top) and in the image taken from a vehicle on the road (bottom) correspond to locations at which a speed limit sign was detected by an object detection network.

Figure 19:
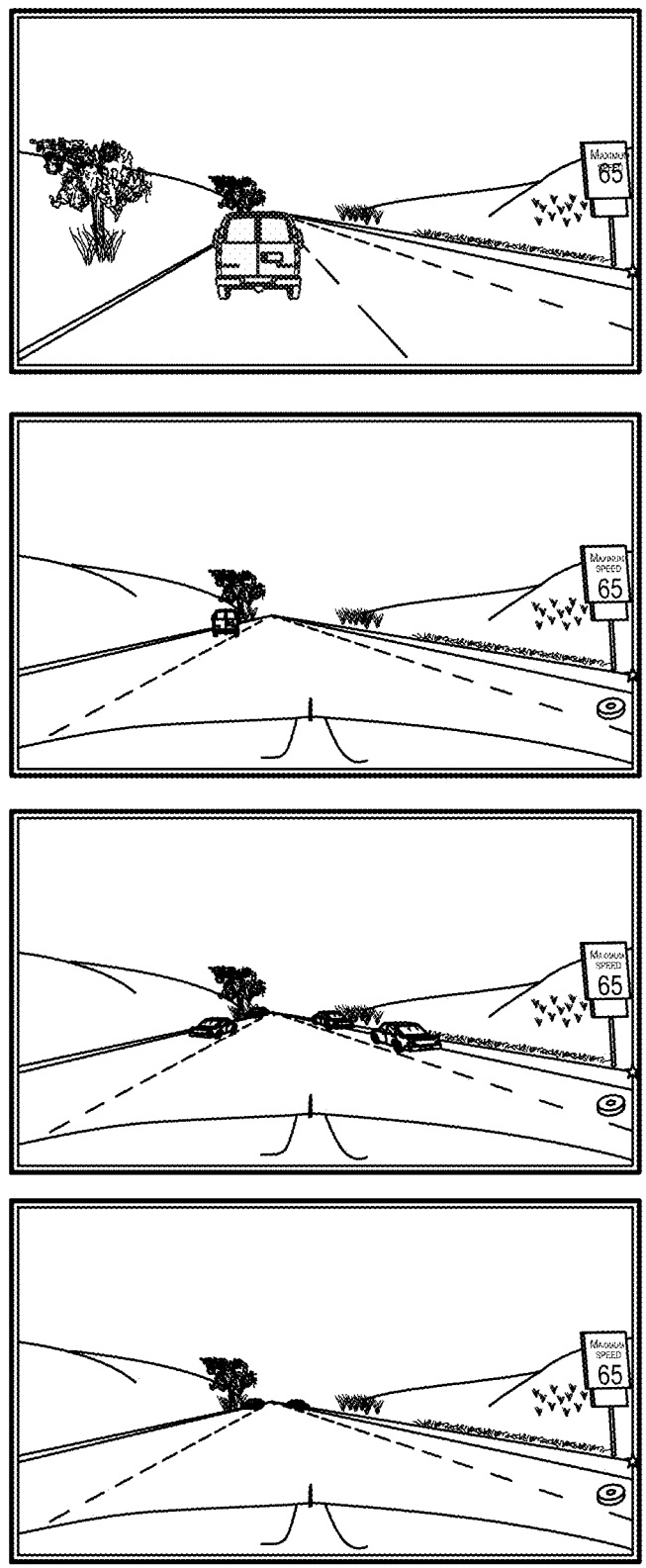
FIG. 19 illustrates an example of a method for determining a curve in accordance with certain aspects of the present disclosure.

FIG. 19 illustrates four images captured by a camera coupled to a vehicle that passed by the same speed limit sign on four different occasions. The speed limit sign shown in FIG. 18 is also visible on the right side of each of the four images in FIG. 19. An open star in each image indicates a location at which a curve corresponding to the right road boundary intersects with the right side of the image. This point also roughly corresponds to the position of at which the pole holding the speed limit side is connected to the ground.

Figure 20:
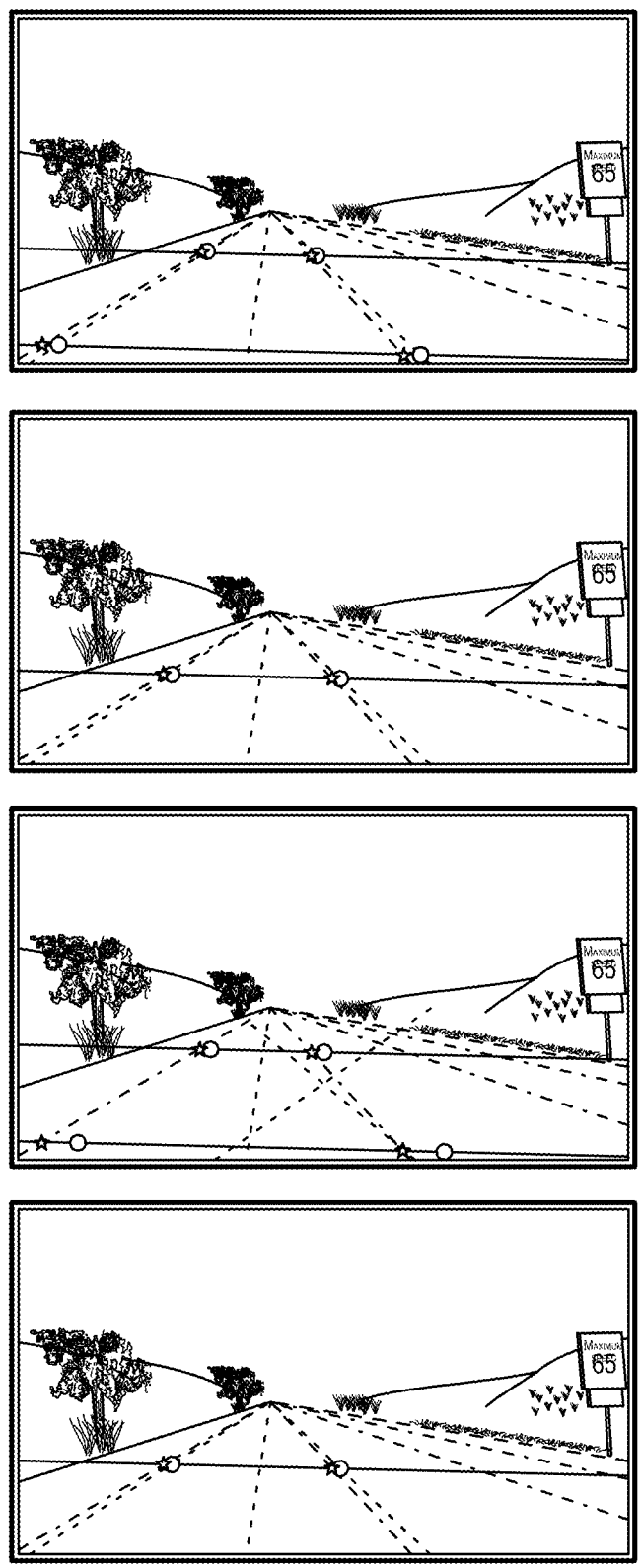
FIG. 20 illustrates an example of a method for determining a curve in accordance with certain aspects of the present disclosure.

FIG. 20 illustrates the use of the outputs of the aforementioned system and methods of curve determination to determine an inverse perspective transformation matrix for a camera coupled to a vehicle. In this example, the determined lanes on the left and right side of the vehicle correspond to a standard US highway lane width of 12 feet. The determined curves for lanes are shown in dashed-dot lines. The determined median lane boundaries and lane center are illustrated in dashed lines, and the right road boundary is illustrated in wider dashed lines. In addition, two solid lines are drawn at an angle parallel to orientation of the camera in the windshield. The solid line about ⅓ of the way up each image has a pixel length approximately half of the solid line at the bottom of the image (measured from the determined left to the determined right road boundary).

Figure 21:
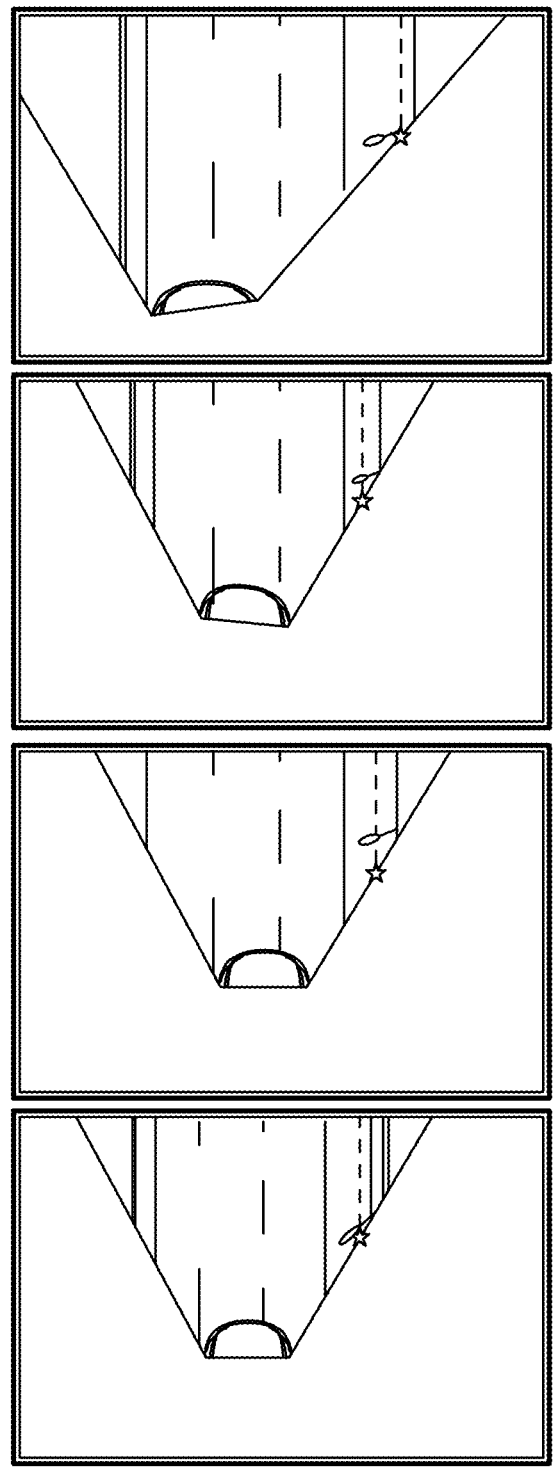
FIG. 21 illustrates an example of a method for determining a curve in accordance with certain aspects of the present disclosure.

FIG. 21 illustrates the four images shown in FIG. 19 transformed according to an inverse perspective mapping based on determined lane boundaries. The inverse perspective mapping may be calculated based on the determined curves and the black cross-lines shown in FIG. 20. As with FIG. 18, the location where the road boundary was determined to have intersected the edge of the image is shown as an open star. In each panel, the shadow of the speed limit sign can be seen. In addition, it can be appreciated that while the four panels come from approximately the same location in space, the top panel was captured from the far-left lane and the remaining three panels were captured from the middle lane. In addition, slight differences in the orientation of the mounted camera is reflected in the slightly different shapes of the image regions from the inverse perspective mapping transformation.

Figure 22:
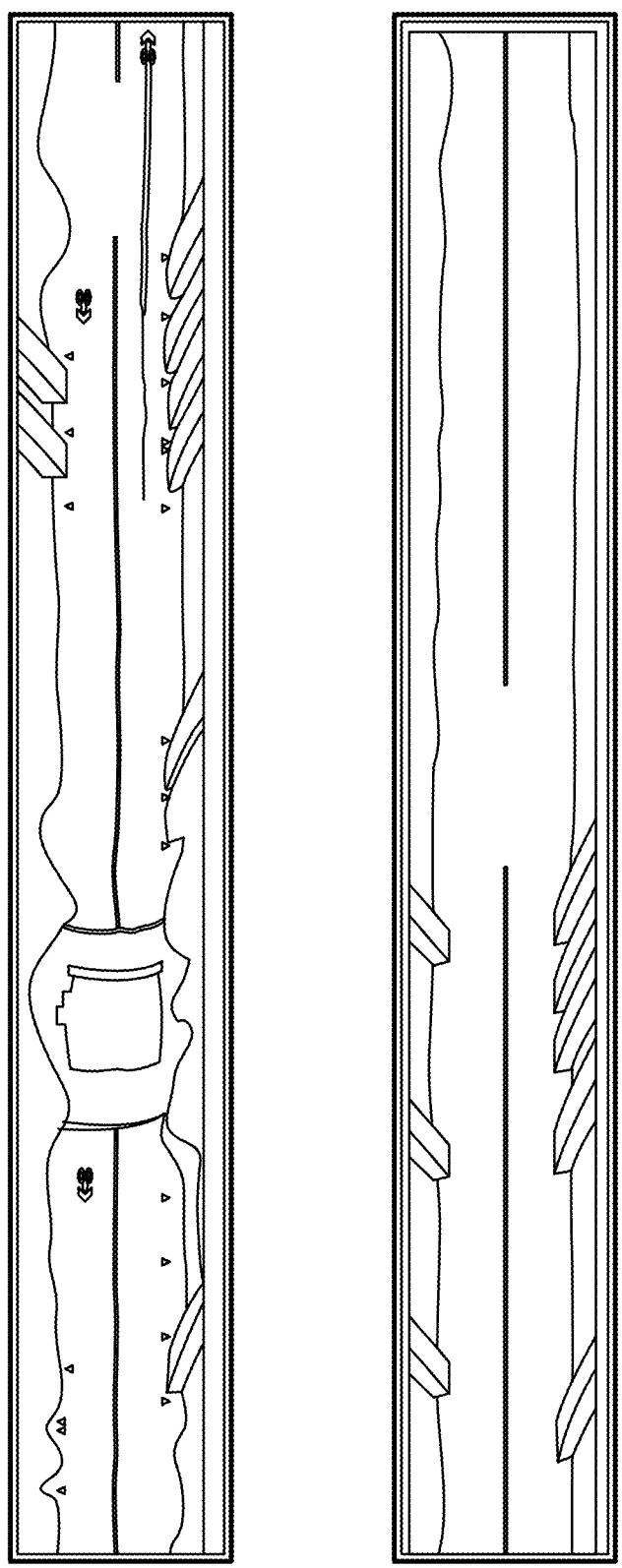
FIG. 22 illustrates an example of a method for determining a curve in accordance with certain aspects of the present disclosure.

FIG. 22 illustrates a stitching together of inverse perspective transformed images for a stretch of road in an urban area. This urban area is different from the location illustrated in FIGS. 19, 20, and 21. In this example, the stitched images are placed according to a determined location of the camera.

Figure 23:
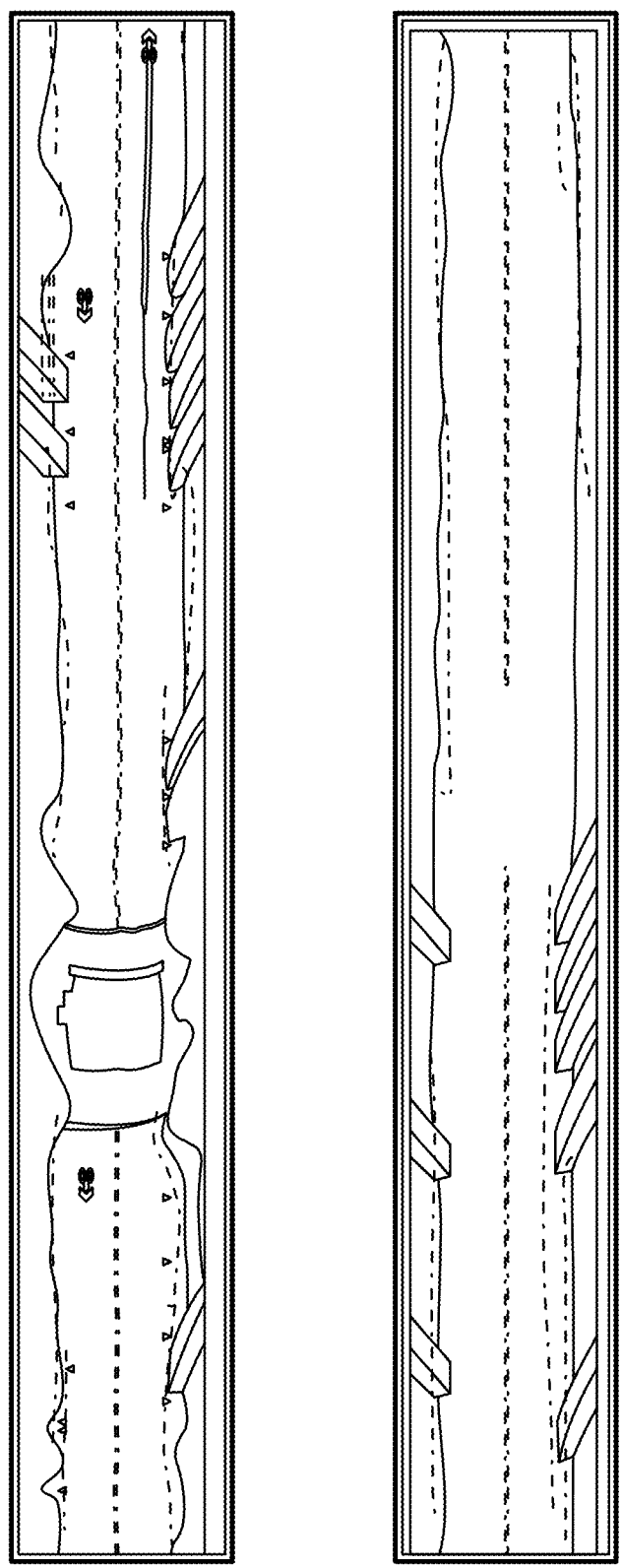
FIG. 23 illustrates an example of a method for determining a curve in accordance with certain aspects of the present disclosure.
Figure 24:
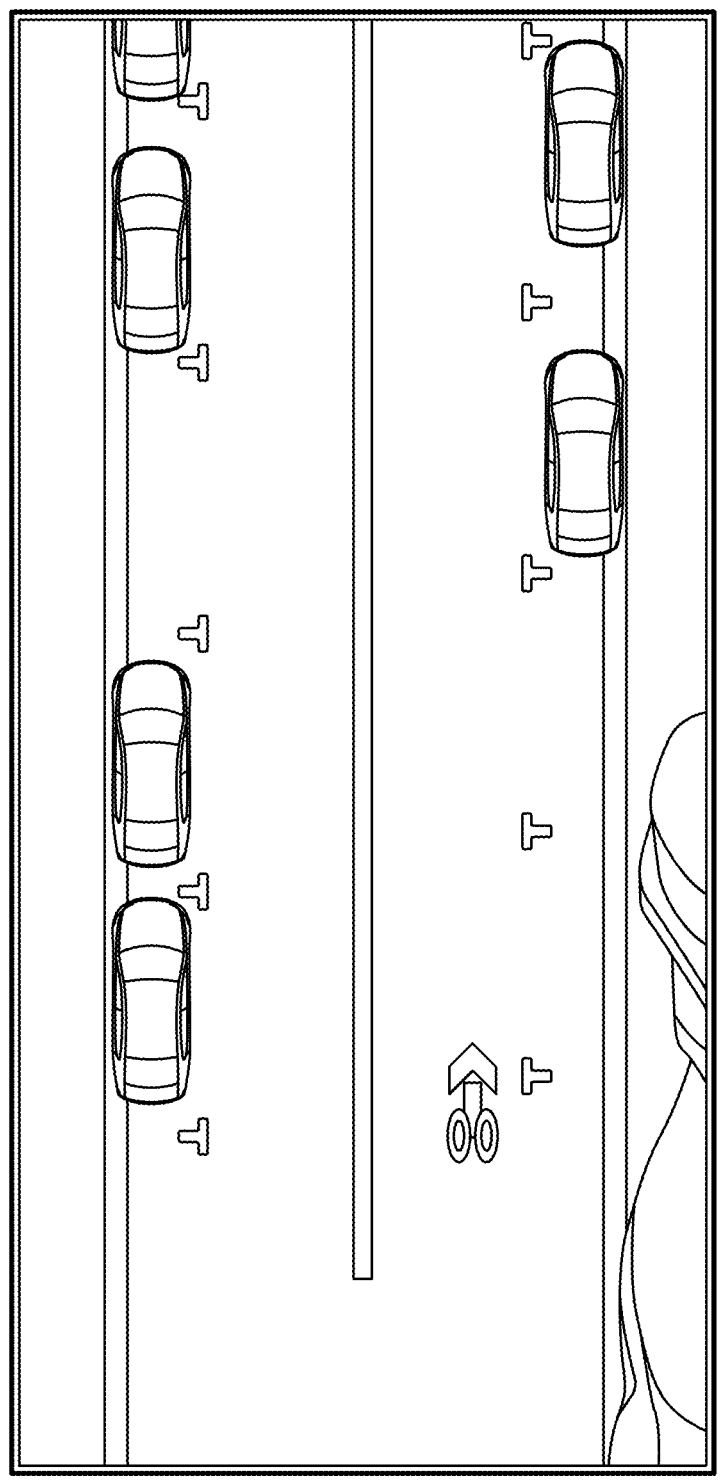
FIG. 24 illustrates an example of a method for determining a curve in accordance with certain aspects of the present disclosure.

FIG. 23 illustrates the same images as shown in FIG. 24, but with determined lanes included in the original images before the inverse perspective transformation. The combined outputs can then be smoothed as used as a map of lane and road boundaries in an earth-based reference frame.

Figure 25:
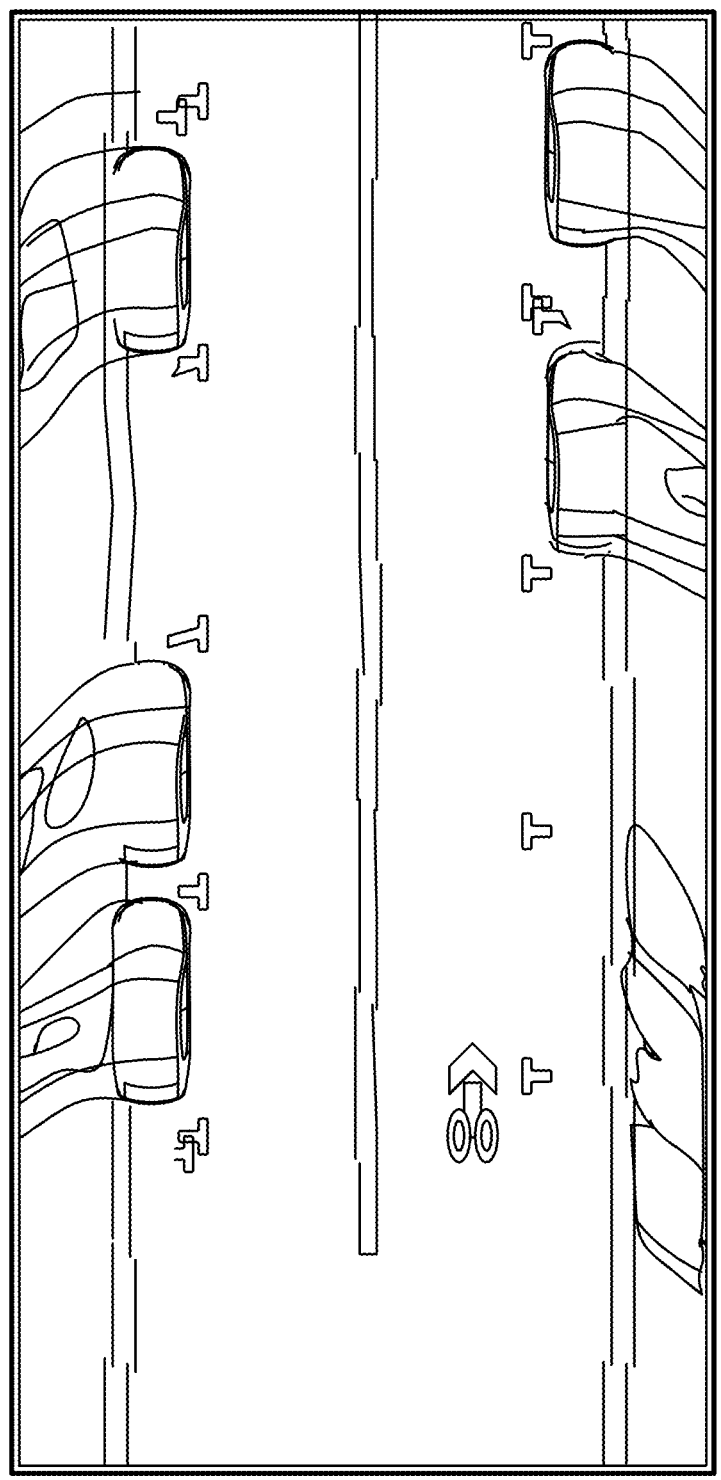
FIG. 25 illustrates an example of a method for determining a curve in accordance with certain aspects of the present disclosure.

FIG. 24 illustrates a portion of the road shown in FIG. 23 but from a satellite image. FIG. 25 illustrates this same portion as a detailed view of the stitched together inverse perspective transformed images. As can be seen, an image produced according to certain aspects of the present disclosure may enable more visual detail compared with a satellite view.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more specialized processors for implementing the neural networks, for example, as well as for other processing systems described herein.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device.

Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method, comprising:
   receiving, from a camera coupled to a vehicle, visual data representing an image captured by the camera;
   processing the visual data with a neural network, the neural network comprising:
      a curve determination branch,
      an object detection branch, and
      a common trunk, the common trunk configured to perform one or more processing operations on the visual data to produce a common trunk output;
   processing the common trunk output with the curve determination branch of the neural network to produce a curve determination data; and
   determining a location of a traffic boundary based on the curve determination data.

2. The method of claim 1, wherein the traffic boundary is a lane boundary or a road boundary.

3. The method of claim 1, wherein the traffic boundary is a lane boundary for an adjacent lane relative to the vehicle, and the lane boundary is entirely occluded by other cars in the captured image.

4. The method of claim 1, further comprising processing the common trunk output with the object detection branch of the neural network to produce object detection data.

5. The method of claim 4, further comprising determining a location of an object based on the object detection data.

6. The method of claim 5, wherein the object is a second vehicle, a traffic sign, or a landmark.

7. The method of claim 4, wherein processing by the curve determination branch and processing by the object detection branch are performed effectively in parallel such that the curve determination data and the object detection data do not depend on each other.

8. The method of claim 1, further comprising:
   providing training data representing a plurality of images captured by one or more cameras coupled to respective vehicles to the neural network; and
   training the curve determination branch of the neural network based on the training data.

9. The method of claim 8, wherein the curve determination branch comprises a first branch and a second branch, wherein the first branch is configured to compute a likelihood that a curve is present in a predetermined portion of the image data, wherein the second branch is configured to compute regression point data, and wherein the location of the traffic boundary is determined based on the likelihood and the regression point data.

10. The method of claim 9, wherein training the curve determination branch of the neural network further comprises:
   setting values of computed regression point data for a given image to zero so that regression guesses associated with lanes that are not present do not flow backwards through the network in a backward pass.

11. The method of claim 8, further comprising providing, by a labeling system and for a given image represented in the training data prior to providing the training data to the neural network, a label of a training layer indicating that a curve might or might not be present in a given region of the given image and that the neural network should not be penalized regardless of a curve detection data output by the neural network in association with the given region.

12. The method of claim 1, wherein the image was captured by the camera when the vehicle was at a first vehicle location on a road, and further comprising:
   receiving second visual data representing a second image captured by the camera when the vehicle was at a second vehicle location on the road;
   determining a second location of the traffic boundary based on the second visual data; and
   mapping the traffic boundary into a world-based coordinate frame, wherein the mapping is based on camera calibration parameters, the first vehicle location, the determined location of the traffic boundary, the second vehicle location, and the determined second location of the traffic boundary.

13. An apparatus, comprising:
   a memory;
   at least one processor operatively coupled to the memory; and
   a set of instructions stored on the memory and configured to be executed by the at least one processor to:
      receive, from a camera coupled to a vehicle, visual data representing an image captured by the camera;
      process the visual data with a neural network, the neural network comprising:
         a curve determination branch,
         an object detection branch, and
         a common trunk, wherein processing operations associated with the common trunk on the visual data produce a common trunk output;
      process the common trunk output with the curve determination branch of the neural network to produce a curve determination data; and
      determine a location of a traffic boundary based on the curve determination data.

14. The apparatus of claim 13, wherein the at least one processor is further configured to:
   process the common trunk output with the object detection branch of the neural network to produce object detection data.

15. The apparatus of claim 14, wherein processing by the curve determination branch and processing by the object detection branch are performed effectively in parallel such that the curve determination data and the object detection data do not depend on each other.

16. The apparatus of claim 13, wherein the at least one processor is further configured to:
   provide training data representing a plurality of images captured by one or more cameras coupled to respective vehicles to the neural network; and
   train the curve determination branch of the neural network based on the training data.

17. A computer program product, the computer program product comprising a non-transitory computer-readable medium having program code recorded thereon, the program code comprising program code executable by one or more processors to:
   receive, from a camera coupled to a vehicle, visual data representing an image captured by the camera;
   process the visual data with a neural network, the neural network comprising:
      a curve determination branch,
      an object detection branch, and a common trunk, wherein processing operations associated with the common trunk on the visual data produce a common trunk output;
process the common trunk output with the curve determination branch of the neural network to produce a curve determination data; and
determine a location of a traffic boundary based on the curve determination data.

18. The computer program product of claim 17, wherein the program code is further executable by the one or more processors to:
process the common trunk output with the object detection branch of the neural network to produce object detection data.

19. The computer program product of claim 18, wherein processing by the curve determination branch and processing by the object detection branch are performed effectively in parallel such that the curve determination data and the object detection data do not depend on each other.

20. The computer program product of claim 17, wherein the program code is further executable by the one or more processors to:
provide training data representing a plurality of images captured by one or more cameras coupled to respective vehicles to the neural network; and
train the curve determination branch of the neural network based on the training data.

* * * * *